(12) United States Patent
Carolan et al.

(10) Patent No.: US 11,334,107 B2
(45) Date of Patent: May 17, 2022

(54) APPARATUS AND METHODS FOR OPTICAL NEURAL NETWORK

(71) Applicant: Massachusetts Institute of Technology, Cambridge, MA (US)

(72) Inventors: Jacques Johannes Carolan, Cambridge, MA (US); Mihika Prabhu, Cambridge, MA (US); Scott A. Skirlo, Boston, MA (US); Yichen Shen, Cambridge, MA (US); Marin Soljacic, Belmont, MA (US); Dirk Englund, Brookline, MA (US); Nicholas Christopher Harris, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 106 days.

(21) Appl. No.: 16/986,383

(22) Filed: Aug. 6, 2020

(65) Prior Publication Data
US 2020/0379504 A1 Dec. 3, 2020

Related U.S. Application Data

(63) Continuation of application No. 16/273,257, filed on Feb. 12, 2019, now Pat. No. 10,768,659, which is a
(Continued)

(51) Int. Cl.
*G06E 3/00* (2006.01)
*G06N 3/04* (2006.01)
(Continued)

(52) U.S. Cl.
CPC ............. *G06E 3/005* (2013.01); *G02F 1/225* (2013.01); *G02F 1/3526* (2013.01); *G02F 1/365* (2013.01);
(Continued)

(58) Field of Classification Search
CPC ........ G02F 1/225; G02F 1/3526; G02F 1/365; G06N 3/0675; G06N 3/08; G06E 3/005; G06E 3/006; G06E 3/008
See application file for complete search history.

(56) References Cited

U.S. PATENT DOCUMENTS

| 4,567,569 A | 1/1986 | Caulfield et al. |
| 4,633,428 A | 12/1986 | Byron |
| (Continued) | | |

FOREIGN PATENT DOCUMENTS

| CN | 1713027 A | 12/2005 |
| CN | 1826518 A | 8/2006 |
| (Continued) | | |

OTHER PUBLICATIONS

Huang, "A digital optical cellular image processor (DOCIP): Theory, architecture and implementation." PhD Dissertation University of Southern California, Sep. 1988. 260 pages.
(Continued)

*Primary Examiner* — Thomas A Hollweg
*Assistant Examiner* — Mary A El-Shammaa
(74) *Attorney, Agent, or Firm* — Smith Baluch LLP

(57) ABSTRACT

An optical neural network is constructed based on photonic integrated circuits to perform neuromorphic computing. In the optical neural network, matrix multiplication is implemented using one or more optical interference units, which can apply an arbitrary weighting matrix multiplication to an array of input optical signals. Nonlinear activation is realized by an optical nonlinearity unit, which can be based on nonlinear optical effects, such as saturable absorption. These calculations are implemented optically, thereby resulting in high calculation speeds and low power consumption in the optical neural network.

33 Claims, 19 Drawing Sheets

Related U.S. Application Data continuation of application No. 15/612,043, filed on Jun. 2, 2017, now Pat. No. 10,268,232.

(60) Provisional application No. 62/344,621, filed on Jun. 2, 2016.

(51) Int. Cl.

| | | |
|---|---|---|
| G06N 3/08 | (2006.01) | |
| G02F 1/225 | (2006.01) | |
| G02F 1/35 | (2006.01) | |
| G02F 1/365 | (2006.01) | |
| G02F 3/02 | (2006.01) | |
| G06N 3/067 | (2006.01) | |
| G02F 1/21 | (2006.01) | |

(52) U.S. Cl.
CPC ............. *G02F 3/024* (2013.01); *G06E 3/006* (2013.01); *G06E 3/008* (2013.01); *G06N 3/04* (2013.01); *G06N 3/0675* (2013.01); *G06N 3/08* (2013.01); *G06N 3/084* (2013.01); *G02F 1/212* (2021.01); *G02F 2202/32* (2013.01); *G02F 2203/15* (2013.01)

(56) References Cited

U.S. PATENT DOCUMENTS

| | | |
|---|---|---|
| 5,004,309 A | 4/1991 | Caulfield et al. |
| 5,077,619 A | 12/1991 | Toms |
| 5,095,459 A | 3/1992 | Ohta et al. |
| 5,220,643 A | 6/1993 | Collings |
| 5,428,711 A | 6/1995 | Akiyama et al. |
| 5,699,449 A | 12/1997 | Javidi |
| 6,005,998 A | 12/1999 | Lee |
| 7,173,272 B2 | 2/2007 | Ralph |
| 7,660,533 B1 | 2/2010 | Meyers et al. |
| 7,876,248 B2 | 1/2011 | Berkley et al. |
| 7,985,965 B2 | 7/2011 | Barker et al. |
| 8,018,244 B2 | 9/2011 | Berkley |
| 8,023,828 B2 | 9/2011 | Beausoleil et al. |
| 8,035,540 B2 | 10/2011 | Berkley et al. |
| 8,190,553 B2 | 5/2012 | Routt |
| 8,223,414 B2 | 7/2012 | Goto et al. |
| 8,386,899 B2 | 2/2013 | Goto et al. |
| 8,560,282 B2 | 10/2013 | Macready et al. |
| 8,604,944 B2 | 12/2013 | Berkley et al. |
| 8,620,855 B2 | 12/2013 | Bonderson |
| 8,837,544 B2 | 9/2014 | Santori et al. |
| 9,250,391 B2 | 2/2016 | McLaughlin et al. |
| 9,354,039 B2 | 5/2016 | Mower et al. |
| 9,791,258 B2 | 10/2017 | Mower et al. |
| 10,268,232 B2 | 4/2019 | Harris et al. |
| 10,359,272 B2 | 7/2019 | Mower et al. |
| 10,619,993 B2 | 4/2020 | Mower et al. |
| 10,634,851 B2 | 4/2020 | Steinbrecher et al. |
| 10,768,659 B2 | 9/2020 | Carolan et al. |
| 2003/0086138 A1 | 5/2003 | Pittman et al. |
| 2003/0235363 A1 | 12/2003 | Pfeiffer |
| 2004/0243657 A1 | 12/2004 | Goren et al. |
| 2007/0180586 A1 | 8/2007 | Amin |
| 2008/0031566 A1 | 2/2008 | Matsubara et al. |
| 2008/0212186 A1 | 9/2008 | Zoller et al. |
| 2008/0273835 A1 | 11/2008 | Popovic |
| 2009/0028554 A1 | 1/2009 | Anderson et al. |
| 2010/0226608 A1 | 9/2010 | Chen et al. |
| 2013/0011093 A1 | 1/2013 | Goh et al. |
| 2014/0241657 A1 | 8/2014 | Manouvrier |
| 2014/0299743 A1 | 10/2014 | Miller |
| 2015/0009548 A1 | 1/2015 | Bienstman et al. |
| 2015/0354938 A1 | 12/2015 | Mower et al. |
| 2015/0382089 A1 | 12/2015 | Mazed |
| 2016/0103281 A1 | 4/2016 | Matsumoto |
| 2016/0118106 A1 | 4/2016 | Yoshimura et al. |
| 2016/0162798 A1 | 6/2016 | Marandi et al. |
| 2017/0031101 A1 | 2/2017 | Miller |
| 2017/0285373 A1 | 10/2017 | Zhang et al. |
| 2018/0274900 A1 | 9/2018 | Mower et al. |
| 2018/0335574 A1 | 11/2018 | Steinbrecher et al. |
| 2019/0019100 A1 | 1/2019 | Roques-Carmes et al. |
| 2019/0244090 A1 | 8/2019 | Englund |
| 2020/0284989 A1 | 9/2020 | Steinbrecher et al. |

FOREIGN PATENT DOCUMENTS

| | | |
|---|---|---|
| CN | 101630178 A | 1/2010 |
| CN | 102164017 A | 8/2011 |
| CN | 103885141 A | 6/2014 |
| CN | 105046325 A | 11/2015 |
| EP | 0399753 A2 | 11/1990 |
| GB | 8911917 | 11/1989 |
| JP | H02157832 A | 6/1990 |
| JP | H03204624 A | 9/1991 |
| JP | H10239214 A | 9/1998 |
| WO | 2005029404 A2 | 3/2005 |
| WO | 2006023067 A2 | 3/2006 |
| WO | 2008069490 A1 | 6/2008 |
| WO | 2018098230 A1 | 5/2018 |

OTHER PUBLICATIONS

Huang, A Digital Optical Cellular Image Processor (DOCIP): Theory, Architecture and Implementation. USC-SIPI Report #133, Nov. 1988. 259 pages.

Aaronson, S. et al., "Computational complexity of linear optics", in Proceedings of the 43rd Annual ACM Symposium on Theory of Computing (ACM, New York, NY, USA, 2011), STOC '11, pp. 333-342, ISBN 978-1-4503-0691-1.

Abu-Mostafa et al., "Optical neural computers." Scientific American 256.3 (1987): 88-95.

Albert et al., "Statistical mechanics of com- plex networks," Reviews of Modern Physics, vol. 74, pp. 47-97, Jan. 2002.

Almeida, V. R., et al., "All-optical control of light on a silicon chip", Nature, vol. 431, (Aug. 6, 2004), pp. 1081-1084.

Amir, A. et al., "Classical diffusion of a quantum particle in a noisy environment", Physical Review, E 79, 050105 (Feb. 5, 2009), 5 pages.

Amit et al., "Spin-glass models of neural networks," Physical Review A, vol. 32, pp. 1007-1018, Aug. 1985.

Anitha et al., Comparative study of high performance brauns multiplier using fpga. IOSR J Electron Commun Eng (IOSRJECE) 1, 33-37 (2012).

Appellant et al., "Information processing using a single dynamical node as complex system," Nature Communications 2,6 pages (2011).

Arjovsky et al., "Unitary Evolution Recurrent Neural Networks," arXiv:1511.06464, 9 pages (2015).

Aspuru-Guzik A. et al., "Simulated Quantum Computation of Molecular Energies", Science 309, 1704 (2005), 21 pages.

Aspuru-Guzik, A. et al., "Photonic quantum simulators", Nat. Phys., 8, 285 (2012), 29 pages.

Atabaki et al., Integrating photonics with silicon nanoelectronics for the next generation of systems on a chip. Nature 556, 349 (2018). 10 pages.

Baehr-Jones et al., "A 25 GB/s Silicon Photonics Platform," arXiv reprints. URL http://adsabs.harvard.edu/abs/2012arXiv1203.0767B, 1203.0767, 11 pages (2012).

Bao et al., "Atomic-Layer Graphene as a Saturable Absorber for Ultrafast Pulsed Lasers," Advanced Functional Materials 19, pp. 3077-3083 (2009).

Bao et al., "Monolayer graphene as a saturable absorber in a mode-locked laser," Nano Res. 4, pp. 297-307 (2010).

Barahona, "On the computational complexity of Ising spin glass models," Journal of Physics A: Mathematical and General, vol. 15, pp. 3241-3253, Oct. 1982.

Bertsimas et al., "Robust optimization with simulated annealing," Journal of Global Optimization 48, pp. 323-334 (2010).

Bewick, Fast multiplication: algorithms and implementation. Ph.D. thesis, Stanford University (1994). 170 pages.

(56) References Cited

OTHER PUBLICATIONS

Bonneau et al., "Quantum interference and manipulation of entanglement in silicon wire waveguide quantum circuits." New Journal of Physics 14.4 (2012): 045003. 13 pages.

Brilliantov, "Effective magnetic Hamiltonian and Ginzburg criterion for fluids," Physical Review E, vol. 58, pp. 2628-2631, Aug. 1998.

Bromberg, Y. et al., "Bloch oscillations of path-entangled photons", Phys. Rev. Lett., vol. 105, (May 18, 2011), 5 pages.

Bromberg, Y. et al., "Quantum and Classical Correlations in Waveguide Lattices", Phys. Rev. Lett. 102, (Jun. 26, 2009), p. 253904-1-253904-4.

Broome, M. A. et al., "Photonic Boson Sampling in a Tunable Circuit", Science 339, 794 (Dec. 20, 2012), 6 pages.

Bruck et al., "On the power of neural networks for solving hard problems," Journal of Complexity, vol. 6, pp. 129-135, Jun. 1990.

Canziani et al., A. Evaluation of neural network architectures for embedded systems. In Circuits and Systems (ISCAS), 2017 IEEE International Symposium on, 1-4 (IEEE, 2017).

Cardenas et al., "Low loss etchless silicon photonic waveguides," Opt. Express, vol. 17, No. 6, pp. 4752-4757 (2009).

Carolan et al., "Universal linear optics," Science, vol. 349, pp. 711-716, Aug. 2015.

Caves, Quantum-mechanical noise in an interferometer. Physical Review D 23, 1693 (1981). 16 pages.

Centeno et al., "Optical bistability in finite-size nonlinear bidimensional photonic crystals doped by a microcavity," Phys. Rev., vol. 62, No. 12, pp. R7683-R7686 (2000).

Chan, "Optical flow switching networks," Proceedings of the IEEE, vol. 100, No. 5, pp. 1079-1091, 2012.

Chen et al., DianNao: A small-footprint high-throughput accelerator for ubiquitous machine-learning. ACM Sigplan Notices 49, 269-284 (2014).

Chen, J. et al., "Efficient photon pair sources based on silicon-on-insulator microresonators", SPIE, vol. 7815, (2010), 9 pages.

Chen, J. et al., "Frequency-bin entangled comb of photon pairs from a Silicon-on-Insulator micro-resonator", Optics Express, vol. 19, No. 2, (Jan. 17, 2011), pp. 1470-1483.

Chen, L. et al., "Compact, low-loss and low-power 8x8 braodband silicon optical switch," Optics Express 20(17), 18977-18985 (2012).

Chen, Q. et al., "A Universal method for constructing N-port non-blocking optical router based on 2x2 optical switch", Optics Express 22, 12614 (Aug. 25-28, 2014), p. 357-361.

Cheng et al., "In-plane optical absorption and free carrier absorption in graphene-on-silicon waveguides," IEEE Journal of Selected Topics in Quantum Electronics 20, pp. 43-48 (2014).

Chetlur et al., cuDNN: Efficient primitives for deep learning. arXiv preprint arXiv:1410.0759 (2014). 9 pages.

Childs, A. et al., "Spatial search by quantum walk", Physical Review A, 70 (2), 022314 (Aug. 25, 2004), 12 pages.

Chinese Office Action and English Translation in Chinese Patent Application No. 201780043808.X dated Feb. 3, 2020, 12 pages.

Chung et al., A monolithically integrated large-scale optical phased array in silicon-on-insulator cmos. IEEE Journal of Solid-State Circuits 53, 275-296 (2018).

Cincotti, "Prospects on planar quantum computing." Journal of Lightwave Technology 27.24 (2009): 5755-5766.

Clements et al., "Optimal design for universal multiport interferometers," Optica, vol. 3, p. 1460, Dec. 2016. 6 pages.

Crespi, A. et al., "Integrated multimode interferometers with arbitrary designs for photonic boson sampling", Nat Photon 7, (May 26, 2013), p. 545-549.

Crespi, et al., "Anderson localization of entangled photons in an integrated quantum walk", Nat Photon 7, 322 (Apr. 3, 2013), 7 pages.

Dai, D. et al., "Novel concept for ultracompact polarization splitter-rotator based on silicon nanowires", Optics Express, vol. 19, No. 11, (May 23, 2011), pp. 10940-10949.

Di Giuseppe, G. et al., "Einstein-Podolsky-Rosen Spatial Entanglement in Ordered and Anderson Photonic Lattices", Phys. Rev. Lett. 110, (Apr. 12, 2013), p. 150503-1-150503-5.

Dunningham et al., "Efficient comparison of path-lengths using Fourier multiport devices." Journal of Physics B: Atomic, Molecular and Optical Physics 39.7 (2006): 1579. 9 pages.

E. Ising, "Beitrag zur Theorie des Ferromagnetismus," Z. Phys., 1925. 6 pages.

Esser et al., "Convolutional networks for fast, energy-efficient neuromorphic computing," Proceedings of the National Academy of Sciences 113, 11,441-11,446 (2016).

Extended European Search Report in European Patent Application No. 17807562.8 dated May 6, 2020, 14 pages.

Farht et al., "Optical implementation of the Hopfield model," Applied Optics, vol. 24, p. 1469, May 1985. 7 pages.

Feinberg et al., Making memristive neural network accelerators reliable. In 2018 IEEE International Symposium on High Performance Computer Architecture (HPCA), 52-65 (IEEE, 2018).

Fushman, I. et al., "Controlled Phase Shifts with a Single Quantum Dot", Science, vol. 320, (May 9, 2008), p. 769-772.

George et al., A programmable and configurable mixed-mode FPAA SoC. IEEE Transactions on Very Large Scale Integration (VLSI) Systems 24, 2253-2261 (2016).

Gilmer et al., Neural message passing for quantum chemistry. arXiv preprint arXiv:1704.01212 (2017). 14 pages.

Golub et al., "Calculating the singular values and pseudo-inverse of a matrix," Journal of the Society for Industrial and Applied Mathematics Series B Numerical Analysis, vol. 2, No. 2, pp. 205-224 (1965).

Graves et al., "Hybrid computing using a neural network with dynamic external memory," Nature, vol. 538, 21 pages (2016).

Green, W. et al., "CMOS Integrated Silicon Nanophotonics: Enabling Technology for Exascale Computational System", IBM Corporation, (Invited Talk at SEMICON 2010, Chiba, Japan, Dec. 1, 2010), 30 pages.

Grote et al., First long-term application of squeezed states of light in a gravitational-wave observatory. Physical Review Letters 110, 181101 (2013). 5 pages.

Gruber et al., "Planar-integrated optical vector-matrix multiplier," Applied Optics, vol. 39, p. 5367, Oct. 2000. 7 pages.

Gullans, M., et al., "Single-Photon Nonlinear Optics with Graphene Plasmons", Phys. Rev. Lett. 111, (Dec. 13, 2013), p. 247401-1-247401-5.

Gunn, C., "Cmos photonics for high-speed interconnects", Micro, IEEE 26, (Mar.-Apr. 2006), p. 58-66.

Haffner et al., Low-loss plasmon-assisted electro-optic modulator. Nature 556, 483 (2018). 17 pages.

Halasz et al., "Phase diagram of QCD," Physical Review D, vol. 58, p. 096007, Sep. 1998. 11 pages.

Hamerly et al., "Scaling advantages of all-to-all connectivity in physical annealers: the Coherent Ising Machine vs. D-Wave 2000Q," arXiv preprints, May 2018. 17 pages.

Harris et al., "Integrated source of spectrally filtered correlated photons for large-scale quantum photonic systems." Physical Review X 4.4 (2014): 041047.10 pages.

Harris et al., "Bosonic transport simulations in a large-scale programmable nanophotonic processor," arXiv:1507.03406, 8 pages (2015).

Harris et al., "Efficient, compact and low loss thermooptic phase shifter in silicon," Optics Express, vol. 22, No. 9, pp. 10478-10489 (2014).

Hinton et al., "Reducing the dimensionality of data with neural networks," Science 313, pp. 504-507 (2006).

Hochberg, M. et al., "Silicon Photonics: The Next Fabless Semiconductor Industry", Solid-State Circuits Magazine, IEEE 5, 48 (Feb. 4, 2013), 11 pages.

Honerkamp-Smith et al., "An introduction to critical points for biophysicists; observations of compositional heterogeneity in lipid membranes," Biochimica et Biophysica Acta (BBA)—Biomembranes, vol. 1788, pp. 53-63, Jan. 2009.

Hong, C. K. et al., "Measurement of subpicosecond time intervals between two photons by interference", Phys. Rev. Lett., vol. 59, No. 18, (Nov. 2, 1987), p. 2044-2046.

(56) References Cited

OTHER PUBLICATIONS

Hopefield et al., "Neural computation of decisions in optimization problems," Biological Cybernetics, vol. 52, No. 3, pp. 141-152. 1955.
Hopefield, "Neural networks and physical systems with emergent collective computational abilities.," Proceedings of the National Academy of Sciences of the United States of America, vol. 79, pp. 2554-2558, Apr. 1982.
Horowitz, M., "Computing's energy problem (and what we can do about it)," In 2014 IEEE International Solid-State Circuits Conference Digest of Technical Papers (ISSCC), pp. 10-14 (IEEE, 2014).
Horst, F. et al., "Cascaded Mach-Zehnder wavelength filters in silicon photonics for low loss and flat pass-band WDM (de-)multiplexing", Optics Express, vol. 21, No. 10, (Mar. 5, 2013), pp. 11652-11658.
Humphreys, P. C. et al., "Linear Optical Quantum Computing in a Single Spatial Mode", arXiv:1305.3592, (Nov. 21, 2013), 7 pages.
Inagaki et al., Large-scale ising spin network based on degenerate optical parametric oscillators. Nature Photonics 10, 415(2016).
International Search Report and Written Opinion from corresponding International Application No. PCT/US2015/034500, dated Mar. 15, 2016.
International Search Report and Written Opinion in PCT/US2018/041640 dated Nov. 7, 2018, 14 pages.
International Search Report and Written Opinion dated Sep. 28, 2017 from International Application No. PCT/US2017/035668, 19 pages.
Isichenko, "Percolation, statistical topography, and trans- port in random media," Reviews of Modem Physics, vol. 64, pp. 961-1043, Oct. 1992.
Jaekel et al., Quantum limits in interferometric measurements. EPL (Europhysics Letters) 13, 301 (1990).
Jalali, B. et al., "Silicon Photonics", Journal of Lightwave Technology, vol. 24, No. 12, (Dec. 2006), pp. 4600-4615.
Jia et al., "Caffe: Convolutional architecture for fast feature embedding," In Proceedings of the 22Nd ACM International Conference on Multimedia, MM '14, pp. 675-678 (ACM, New York, NY, USA, 2014). URL http://doi.acm.org/10.1145/2647868.2654889.
Jiang, L. et al., "A planar ion trapping microdevice with integrated waveguides for optical detection", Optics Express, vol. 19, No. 4, (2011), pp. 3037-3043.
Jonsson, An empirical approach to finding energy efficient ADC architectures. In Proc, of 2011 IMEKO IWADC & IEEE ADC Forum, 1-6 (2011).
Jouppi et al. In-datacenter performance analysis of a tensor processing unit. In Computer Architecture (ISCA), 2017 ACM/IEEE 44th Annual International Symposium on, 1-12 (IEEE, 2017).
Kahn et al., Communications expands its space. Nature Photonics 11, 5 (2017). 4 pages.
Kardar et al., "Dynamic Scaling of Growing Interfaces," Physical Review Letters, vol. 56, pp. 889-892, Mar. 1986.
Karpathy, A., "CS231n Convolutional Neural Networks for Visual Recognition," Class notes. Jan. 2018, http://cs231n.github.io/. Accessed Oct. 31, 2018. 2 pages.
Keckler et al., GPUs and the future of parallel computing. IEEE Micro 7-17 (2011).
Kieling, K. et al., "On photonic Controlled Phase Gates", New Journal of Physics, vol. 12, (Jul. 5, 2010), 9 pages.
Kilper et al., Optical networks come of age, Opt. Photon. News, vol. 25, pp. 50-57, Sep. 2014.
Kim et al., A functional hybrid memristor crossbar-array/cmos system for data storage and neuromorphic applications. Nano Letters 12, 389-395 (2011).
Kirkpatrick et al., "Optimization by simulated annealing.," Science (New York, N.Y.), vol. 220, pp. 671-680, May 1983.
Knill et al., "The Bayesian brain: the role of uncertainty in neural coding and computation," Trends in Neurosciences, vol. 27, pp. 712-719, Dec. 2004.
Knill, E. et al., "A scheme for efficient quantum computation with linear optics", Nature 409, 4652 (Jan. 4, 2001), p. 46-52.
Knill, E., "Quantum computing with realistically noisy devices", Nature, vol. 434, (Mar. 3, 2005), p. 39-44.
Kok et al. "Linear optical quantum computing with photonic qubits." Reviews of Modem Physics 79.1 (2007): 135.40 pages.
Koos et al., Silicon-organic hybrid (SOH) and plasmonic-organic hybrid (POH) integration. Journal of Lightwave Technology 34, 256-268 (2016).
Koren, Computer arithmetic algorithms (AK Peters/CRC Press, 2001).
Krizhevsky et al., "Imagenet classification with deep convolutional neural networks," In Pereira, F., Burges, C. J. C., Bottou, L. & Weinberger, K. Q. (eds.), Advances in Neural Information Processing Systems 25, pp. 1097-1105 (Curran Associates, Inc., 2012). URL http://papers.nips.cc/paper/4824-imagenet-classification-with-deep-convolutional-neural-pdf.
Kucherenko, S. et al., "Application of Deterministic Low-Discrepancy Sequences in Global Optimization", Computational Optimization and Applications, vol. 30, (2005), p. 297-318.
Kwack, M-J et al., "Monolithic InP strictly non-blocking 8x8 switch for high-speed WDM optical interconnection," Optics Express 20(27), 28734-28741 (2012).
Lahini, Y. et al., "Anderson Localization and Nonlinearity in One-Dimensional Disordered Photonic Lattices", Phys. Rev. Lett., 100, (Feb. 7, 2008), 4 pages.
Lahini, Y. et al., "Quantum Correlations in Two-Particle Anderson Localization", Phys. Rev. Lett., 105, (Oct. 15, 2010), p. 163905-1-163905-4.
Laing, A. et al., "High-fidelity operation of quantum photonic circuits", Applied Physics Letters, vol. 97, (2010), 5 pages.
Landauer, Irreversibility and heat generation in the computing process. IBM Journal of Research and Development 5, 183-191 (1961).
Lanyon, B. P. et al., "Towards quantum chemistry on a quantum computer", Nature Chemistry 2, 106 (May 8, 2009), 20 pages.
Lawson et al., Basic linear algebra subprograms for Fortran usage. ACM Transactions on Mathematical Software (TOMS) 5, 308-323 (1979).
LeCun et al., "Deep learning," Nature 521, pp. 436-444 (2015).
Lecun et al., Gradient-based learning applied to document recognition. Proceedings of the IEEE 86, 2278-2324 (1998).
Levi, L. et al., Hyper-transport of light and stochastic acceleration by evolving disorder, Nat. Phys., vol. 8, (Dec. 2012), p. 912-917.
Li et al., Efficient and self-adaptive in-situ learning in multilayer memristor neural networks. Nature Communications 9, 2385 (2018). 8 pages.
Lin et al., "All-Optical Machine Learning Using Diffractive Deep Neural Networks," Apr. 2018. 20 pages.
Lu et al., "16 x 16 non-blocking silicon optical switch based on electro-optic Mach-Zehnder interferometers," Optics Express, vol. 24, No. 9, 13 pages, DOI:10.1364/OE.24.009295 (Apr. 20, 2016).
Ma et al., "Optical switching technology comparison: optical mems vs. Other technologies," IEEE communications magazine, vol. 41, No. 11, pp. S16-S23, 2003.
Macready et al., "Criticality and Parallelism in Combinatorial Optimization," Science, vol. 271, pp. 56-59, Jan. 1996.
Marandi et al., Network of time-multiplexed optical parametric oscillators as a coherent Ising machine. Nature Photonics 8, 937 (2014). 6 pages.
Martin-Lopez, E. et al., "Experimental realization of Shor's quantum factoring algorithm using qubit recycling", Nat Photon 6, (Oct. 24, 2012), 7 pages.
Mcmahon et al., "A fully programmable 100-spin coherent (sing machine with all-to-all connections.," Science (New York, N.Y.), vol. 354, pp. 614-617, Nov. 2016.
Mead, C., "Neuromorphic electronic systems," Proceedings of the IEEE, vol. 78, No. 10, pp. 1629-1636 (1990).
Migdall, A. L. et al., "Tailoring single-photon and multiphoton probabilities of a single-photon on-demand source", Phys. Rev. A 66, (May 22, 2002), 4 pages.
Mikkelsen, J.C. et al., "Dimensional variation tolerant silicon-on-insulator directional couplers", Optics Express, vol. 22, No. 3, (Feb. 10, 2014), p. 3145-3150.

(56) References Cited

OTHER PUBLICATIONS

Miller, Are optical transistors the logical next step? Nature Photonics 4, 3 (2010). 3 pages.
Miller, Attojoule optoelectronics for low-energy information processing and communications. Journal of Lightwave Technology 35, 346-396 (2017).
Miller, D. A. B., "Reconfigurable add-drop multiplexer for spatial modes", Optics Express, vol. 21, No. 17, (Aug. 26, 2013), pp. 20220-20229.
Miller, D. A. B., "Self-aligning universal beam coupler", Opt. Express, vol. 21, (Aug. 26, 2013), 6 pages.
Miller, D. A. B., "Perfect optics with imperfect components," Optica 2, pp. 747-750 (2015).
Miller, D. A. B., "Self-configuring universal linear optical component [invited]," Photonics Research 1, URL http://dx.doi.org/10.1364/PRJ.1.000001, 15 pages. (2013).
Miller, Energy consumption in optical modulators for interconnects. Optics Express 20, A293-A308 (2012).
Misra et al., "Artificial neural networks in hardware: A survey of two decades of progress," Neurocomputing 74, pp. 239-255 (2010).
Mohseni, M. et al., "Environment-assisted quantum walks in photosynthetic complexes", The Journal of Chemical Physics 129, (May 18, 2008), 8 pages.
Moore, Cramming more components onto integrated circuits. Electronics 114-117 (1965).
Mower et al., "High-fidelity quantum state evolution in imperfect photonic integrated circuits," Physical Review A, vol. 92, No. 3, p. 032322, 2015. 7 pages.
Mower, J. et al., "Efficient generation of single and entangled photons on a silicon photonic integrated chip", Phys. Rev. A 84, (Oct. 18, 2011), 8 pages.
Nagamatsu et al., A 15-ns 32 32-bit cmos multiplier with an improved parallel structure. In Custom Integrated Circuits Conference, 1989., Proceedings of the IEEE 1989, 10-3 (IEEE, 1989). 4 pages.
Najafi, F. et al., "On-Chip Detection of Entangled Photons by Scalable Integration of Single-Photon Detectors", arXiv:1405.4244 [physics.optics] (May 16, 2014), 27 pages.
Nozaki et al., "Sub-femtojoule all-optical switching using a photonic-crystal nanocavity," Nature Photonics 4, pp. 477-483 (2010).
O'Brien, J. L. et al., "Demonstration of an all-optical quantum controlled—NOT gate", Nature 426, (Feb. 1, 2008), 5 pages.
Onsager, "Crystal Statistics. I. A Two-Dimensional Model with an Order-Disorder Transition," Physical Review, vol. 65, pp. 117-149, Feb. 1944.
Orcutt, J. S. et al., "Nanophotonic integration in state-of-the-art CMOS foundries", Optics Express, vol. 19, No. 3, (2011), pp. 2335-2346.
Partial Supplemental European Search Report in European Patent Application No. 17807562.8 dated Jan. 24, 2020, 12 pages.
Pelissetto et al., "Critical phenomena and renormalization-group theory," Physics Reports, vol. 368, pp. 549-727, Oct. 2002.
Peng, Implementation of AlexNet with Tensorflow. https://github.com/ykpengba/AlexNet-A-Practical-Implementation (2018). Accessed Dec. 3, 2018. 2 pages.
Peretto, "Collective properties of neural networks: a statistical physics approach," Biological Cybernetics, vol. 50, pp. 51-62, Feb. 1984.
Pernice, W. et al., "High-speed and high-efficiency travelling wave single-photon detectors embedded in nanophotonic circuits", Nature Communications 3, 1325 (2012), 23 pages.
Peruzzo, A., et al., "Quantum walk of correlated particles", Science 329, (2010), 8 pages.
Politi, A. et al., "Integrated Quantum Photonics", IEEE Journal of Selected Topics in Quantum Electronics, vol. 5, Issue 6, (2009), 12 pages.
Politi, A. et al., "Silica-on-Silicon Waveguide Quantum Circuits", Science 320, (Feb. 1, 2008), 5 pages.
Poon et al., "Neuromorphic silicon neurons and large-scale neural networks: challenges and opportunities," Frontiers in Neuroscience, vol. 5, Article 108, 3 pages (2011).
Prucnal et al., "Recent progress in semiconductor excitable lasers for photonic spike processing," Advances in Optics and Photonics 8, pp. 228-299 (2016).
Psaltis et al., "Holography in artificial neural networks." Landmark Papers on Photorefractive Nonlinear Optics. 1995. 541-546.
Qiao et al., "16x16 non-blocking silicon electro-optic switch based on mach zehnder interferometers," in Optical Fiber Communication Conference, p. Th1C.2, Optical Society of America, 2016. 3 pages.
Ralph, T. C. et al., "Linear optical controlled—NOT gate in the coincidence basis", Phys. Rev. A, vol. 65, (Jun. 20, 2002), p. 062324-1-062324-5.
Ramanitra et al., "Scalable and multi-service passive optical access infrastructure using variable optical splitters." Optical Fiber Communication Conference. Optical Society of America, 2006, 3 pages.
Raussendorf, R. et al., "A one-way quantum computer", Phys. Rev. Lett. 86, 5188-5191 (2001).
Rechtsman et al., "Photonic floquet topological insulators," Optical Society of America, Technical Digest, 2 pages (2013).
Reck et al., "Experimental realization of any discrete unitary operator," Phys. Rev. Lett. 73, pp. 58-61 (1994).
Reed, G. T. et al., "Silicon optical modulators", Nature Photonics, vol. 4, (2010), pp. 518-526.
Rendl et al., "Solving Max-Cut to optimality by intersecting semidefinite and polyhedral relaxations," Mathematical Programming, vol. 121, pp. 307-335, Feb. 2010.
Rios et al., "Integrated all-photonic non-volatile multilevel memory," Nature Photonics 9, pp. 725-732 (2015).
Rogalski, Progress in focal plane array technologies. Progress in Quantum Electronics 36, 342-473 (2012).
Rohit, A. et al., "8x8 space and wavelength selective cross-connect for simultaneous dynamic multi-wavelength routing", In Optical Fiber Communication Conference, OW1C{4 (Optical Society of America, (2013), 3 pages.
Rosenblatt, The perceptron: a probabilistic model for information storage and organization in the brain. Psychological Review 65, 386 (1958). 23 pages.
Russakovsky et al. ImageNet Large Scale Visual Recognition Challenge. International Journal of Computer Vision (IJCV) 115, 211-252 (2015).
Saade et al., "Random projections through multiple optical scattering: Approximating Kernels at the speed of light," in 2016 IEEE International Conference on Acoustics, Speech and Signal Processing (ICASSP), pp. 6215-6219, IEEE, Mar. 2016.
Salandrino, A. et al., "Analysis of a three-core adiabatic directional coupler", Optics Communications, vol. 282, (2009), pp. 4524-4526.
Schaeff et al., "Scalable fiber integrated source for higher-dimensional path-entangled photonic quNits." Optics Express 20.15 (2012): 16145-16153.
Schirmer et al., "Nonlinear mirror based on two-photon absorption," JOSA B 14, pp. 2865-2868 (1997).
Schmidhuber, J., "Deep learning in neural networks: An overview," Neural Networks 61, pp. 85-117 (2015).
Schreiber, A. et al., "Decoherence and Disorder in Quantum Walks: From Ballistic Spread to Localization", Phys. Rev. Lett., 106, (Jan. 13, 2011), 5 pages.
Schwartz, T. et al., "Transport and Anderson localization in disordered two-dimensional photonic lattices", Nature, vol. 446, (Mar. 1, 2007), p. 52-55.
Selden, A., "Pulse transmission through a saturable absorber," British Journal of Applied Physics 18, pp. 743-748 (1967).
Shafiee et al., "ISAAC: A convolutional neural network accelerator with in-situ analog arithmetic in crossbars," ACM/IEEE 43rd Annual International Symposium on Computer Architecture, in Proc. ISCA, 13 pages (2016).
Shen et al., "Deep Learning with Coherent Nanophotonic Circuits," arXiv:1610.02365, pp. 189-190 (2016).
Shoji, Y. et al., "Low-crosstalk 2x2 thermo-optic switch with silicon wire waveguides," Optics Express 18(9), 9071-9075., published Apr. 15, 2010.

(56) References Cited

OTHER PUBLICATIONS

Silver et al. Mastering chess and shogi by self-play with a general reinforcement learning algorithm. arXiv preprint arXiv:1712.01815. (2017). 19 pages.
Silver et al., Mastering the game of go with deep neural networks and tree search, Nature 529, pp. 484-489 (2016).
Silverstone, J. et al., "On-chip quantum interference between silicon photon-pair sources", Nat. Photon., advanced online publication (2013), 5 pages.
Smith et al., "Phase-controlled integrated photonic quantum circuits." Optics Express 17.16 (2009): 13516-13525.
Soljačić et al., "Optimal bistable switching in nonlinear photonic crystals," Physical Review E 66, pp. 055601-4 (2002).
Solli et al., "Analog optical computing." Nature Photonics 9.11 (2015): 704. 3 pages.
Spring, J. B. et al., "Boson sampling on a photonic chip", Science 339, (2013), 24 pages.
Srinivasan et al., 56 Gb/s germanium waveguide electro-absorption modulator. Journal of Lightwave Technology 34, 419-424 (2016).
Steinkraus et al., Using GPUs for machine learning algorithms. In Document Analysis and Recognition, 2005. Proceedings. Eighth International Conference on, 1115-1120 (IEEE, 2005).
Suda et al., "Quantum interference of photons in simple networks." Quantum information processing 12.5 (2013): 1915-1945.
Sun et al., "Large-scale nanophotonic phased array," Nature 493, pp. 195-199 (2013). URL http://dx.doi.org/10.1038/nature11727.
Sun et al., Single-chip microprocessor that communicates directly using light, Nature 528, pp. 534-538 (2015). URL http://dx.doi.org/10.1038/nature16454.
Suzuki, K. et al., "Ultra-compact 8x8 strictly-non-blocking Si-wire PILOSS switch," Optics Express 22(4), 3887-3894 (2014).
Sze et al., Efficient processing of deep neural networks: A tutorial and survey. Proceedings of the IEEE 105, 2295-2329 (2017).
Tabia, "Experimental scheme for qubit and qutrit symmetric informationally complete positive operator-valued measurements using multiport devices." Physical Review A 86.6 (2012): 062107. 8 pages.
Tait et al., "Broadcast and weight: an integrated network for scalable photonic spike processing," Journal of Lightwave Technology 32, pp. 3427-3439 (2014).
Tait et al., "Photonic Neuromorphic Signal Processing and Computing," pp. 183-222, Springer, Berlin, Heidelberg, 2014.
Tait et al., Neuromorphic photonic networks using silicon photonic weight banks. Scientific Reports 7, 7430 (2017). 10 pages.
Tanabe et al., "Fast bistable all-optical switch and memory on a silicon photonic crystal on-chip," Opt. Lett. 30, pp. 2575-2577(2005).
Tanizawa, K. et al., "Ultra-compact 32 x 32 strictly-non-blocking Si-wire optical switch with fan-out LGA interposer," Optics Express 23(13), 17599-17606 (2015).
Thompson, M. G. et al., "Integrated waveguide circuits for optical quantum computing", IET Circuits Devices Syst., 2011, vol. 5, Iss. 2, pp. 94-102.
Timurdogan et al., An ultralow power athermal silicon modulator. Nature Communications 5, 4008 (2014). 11 pages.
Vandoorne et al., "Experimental demonstration of reservoir computing on a silicon photonics chip," Nature Communications 5, 6 pages (2014).
Vazquez et al., "Optical NP problem solver on laser-written waveguide plat-form," Optics Express, vol. 26, p. 702, Jan. 2018. 9 pages.
Vivien et al., "Zero-bias 40gbit/s germanium waveguide photodetector on silicon," Opt. Express, vol. 20, No. 2, pp. 1096-1101 (2012).
W. A. Little, "The existence of persistent states in the brain," Mathematical Biosciences, vol. 19, No. 1-2, 1974. 20 pages.
Wang et al., "Coherent (sing machine based on degenerate optical parametric oscillators," Physical Review A, vol. 88, p. 063853, Dec. 2013. 9 pages.
Wang et al., Deep learning for identifying metastatic breast cancer. arXiv preprint arXiv:1606.05718 (2016).6 pages.
Werbos, Beyond regression: New tools for prediction and analysis in the behavioral sciences. Ph.D. dissertation, Harvard University (1974). 454 pages.
Whitfield, J. D. et al., "Simulation of electronic structure Hamiltonians using quantum computers", Molecular Physics 109, 735 (Dec. 19, 2010), 22 pages.
Wu et al., "An optical fiber network oracle for NP-complete problems," Light: Science & Applications, vol. 3, pp. e147-e147, Feb. 2014.
Xia, F., et al., "Mode conversion losses in silicon-on-insulator photonic wire based racetrack resonators", Optics Express, vol. 14, No. 9, (2006), p. 3872-3886.
Xu et al., "Experimental observations of bistability and instability in a two-dimensional nonlinear optical superlattice," Phys. Rev. Lett. 71, pp. 3959-3962 (1993).
Yang, M. et al., "Non-Blocking 4x4 Electro-Optic Silicon Switch for On-Chip Photonic Networks", Opt. Express, vol. 19, No. 1, (Dec. 20, 2010), p. 47-54.
Yao et al., Serial-parallel multipliers. In Signals, Systems and Computers, 1993. 1993 Conference Record of the Twenty-Seventh Asilomar Conference on, 359-363 (IEEE, 1993).
Young et al., Recent trends in deep learning based natural language processing. IEEE Computational Intelligence Magazine 13, 55-75 (2018).
Zhou, X.-Q., et al., "Calculating Unknown Eigenvalues with a Quantum Algorithm", Nat. Photon 7, (2013), pp. 223-228.
Caulfield et al., "Optical neural networks." Proceedings of the IEEE 77.10 (1989): 1573-1583.
Da-Qi et al., "The research progress and prospects of artificial neural networks [J]" Journal of Southern Yangtze University 1 (2004). 8 pages.
Lu et al., "Two-dimensional programmable optical neural network." Applied Optics 28.22 (1989): 4908-4913.
Japanese Office Action and English Translation Thereof in Japanese Application No. 2018-563066 dated Jun. 25, 2021, 15 pages.

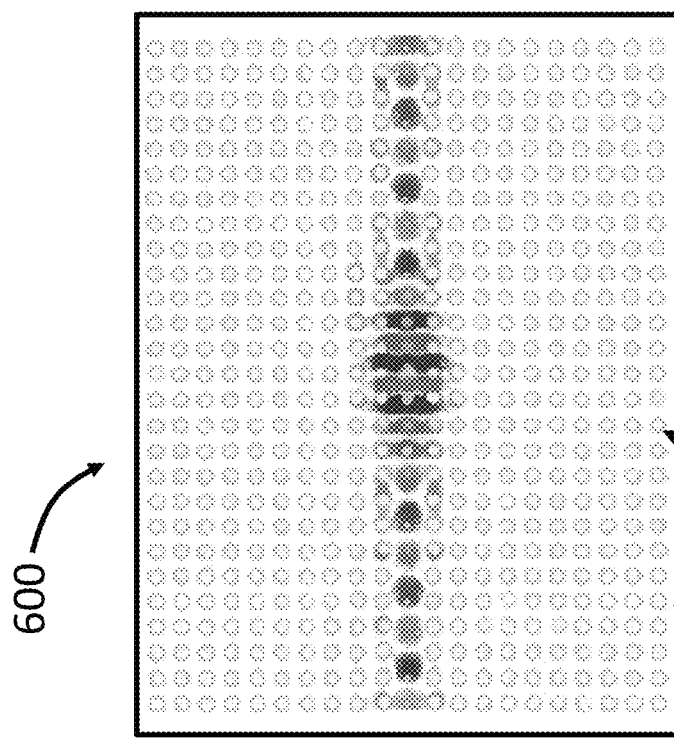
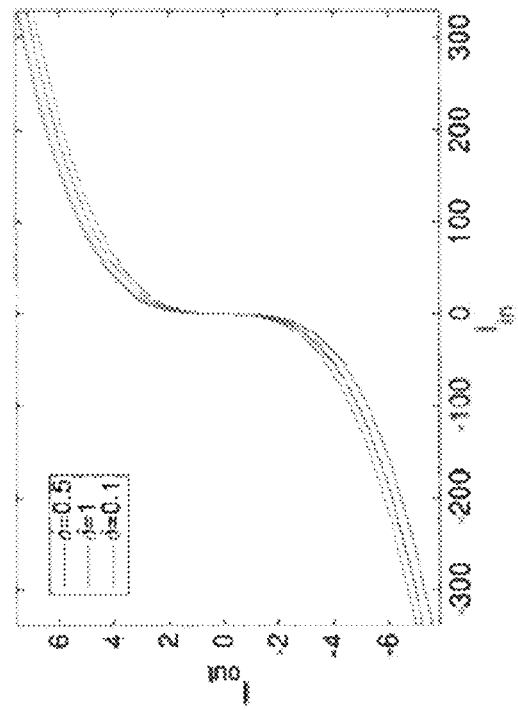
FIG. 6A
FIG. 6B

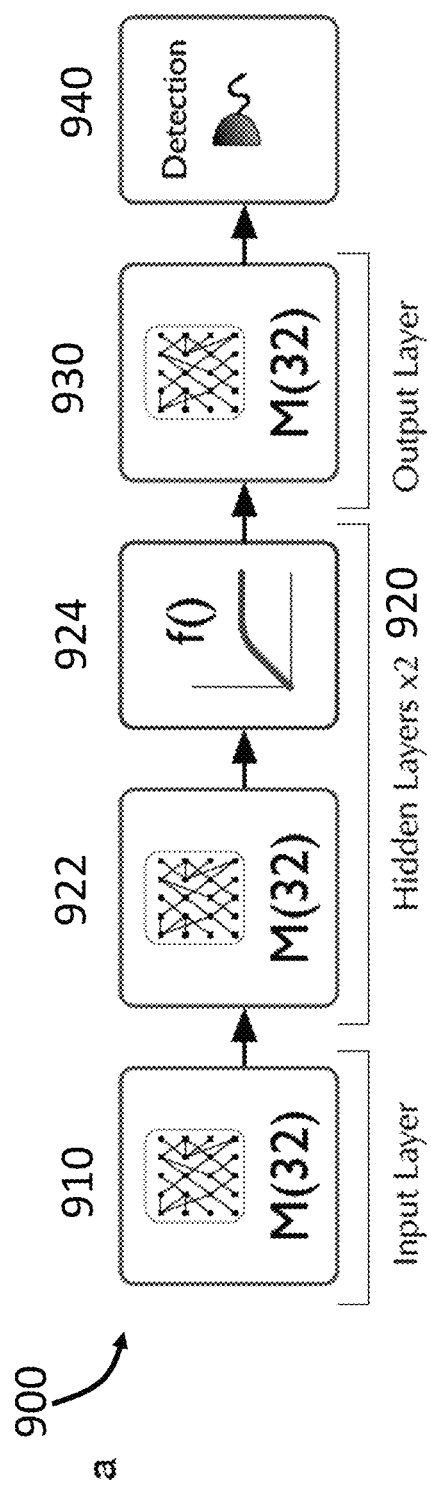
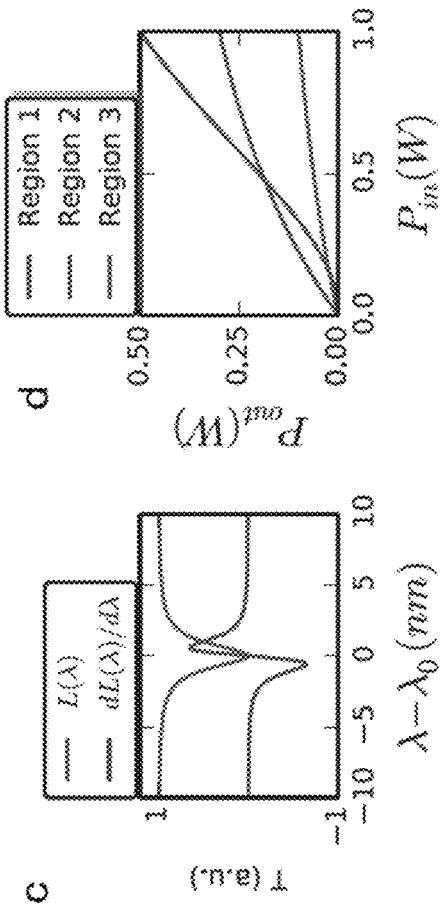
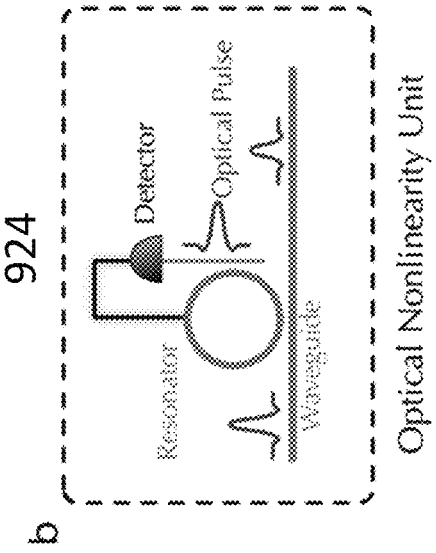
FIG. 9A
FIG. 9B
FIG. 9C
FIG. 9D

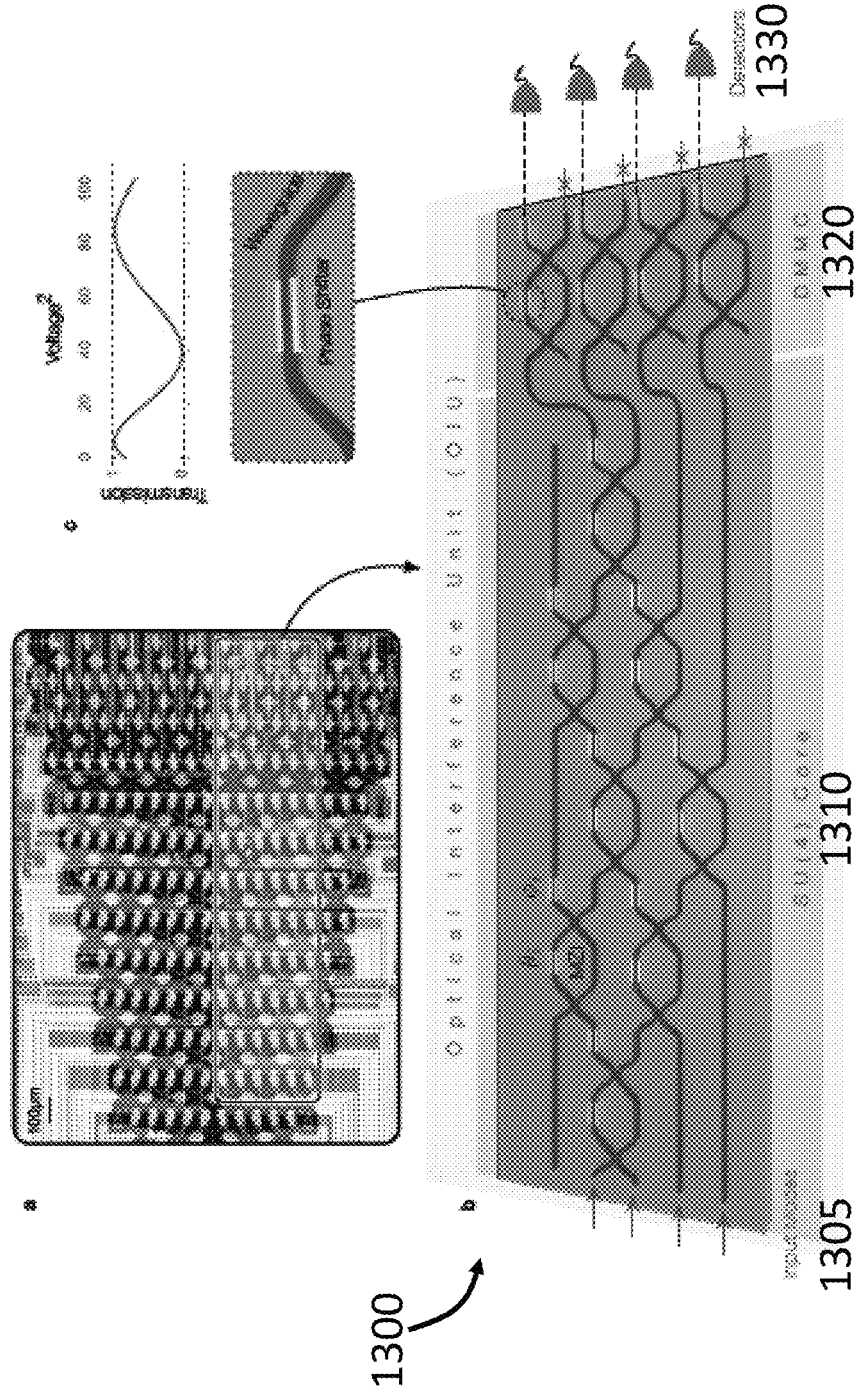

APPARATUS AND METHODS FOR OPTICAL NEURAL NETWORK

CROSS-REFERENCES TO RELATED APPLICATIONS

This application is a continuation of U.S. application Ser. No. 16/273,257, filed Feb. 12, 2019, and entitled "Apparatus and Methods for Optical Neural Network," which is a continuation of U.S. application Ser. No. 15/612,043, filed Jun. 2, 2017, and entitled "Apparatus and Methods for Optical Neural Network," which in turn claims priority to U.S. Application No. 62/344,621, filed Jun. 2, 2016, entitled "METHODS AND DESIGN OF OPTICAL NEURAL NETWORK." Each of these applications is hereby incorporated herein by reference in its entirety.

GOVERNMENT SUPPORT

This invention was made with Government support under Contract No. W911NF-13-D-0001 awarded by the Army Research Office. The Government has certain rights in the invention.

BACKGROUND

Existing computers based on the von Neumann architecture are usually more power-hungry and less effective than their biological counterparts—central nervous systems—for a wide range of tasks, such as perception, communication, learning, and decision making. With the increasing volume of data associated with big data processing, it becomes beneficial to develop computers that can learn, combine, and analyze vast amounts of information quickly and efficiently. For example, speech recognition software (e.g., Apple's Siri) is typically executed in the cloud because the involved computations are usually too challenging for hardware in a mobile phone.

One approach to address the shortcomings of von Neumann computing architectures is to develop artificial neural networks (ANNWs). ANNWs generally mimic the signal processing architecture in the brain and have recently received an explosion of interests. They can dramatically improve speech recognition, visual object recognition, object detection, and many other domains, such as drug discovery and genomics. Conventional artificial neural networks usually use electronic architectures, such as application-specific integrated circuits (ASICs) and field-programmable gate arrays (FPGAs). However, the computational speed and power efficiency achieved with these hardware architectures are still limited by electronic clock rates and ohmic losses.

SUMMARY

Embodiments of the present technology generally relate to artificial neural networks. In one example, an apparatus for implementing an artificial neural network includes an array of input waveguides to receive a first array of optical signals. An optical interference unit is in optical communication with the array of input waveguides to perform a linear transformation of the first array of optical signals into a second array of optical signals. The apparatus also includes an optical nonlinearity unit, in optical communication with the optical interference unit, to perform a nonlinear transformation on the second array of optical signals so as to generate a third array of optical signals. A detector array, in optical communication with the optical nonlinearity unit, to detect the third array of optical signals.

In another example, a method for artificial neural network computation includes receiving a first array of optical signals with an array of input waveguides. The method also includes interfering the first array of optical signals, using an optical interference unit in optical communication with the array of input waveguides, to linearly transform the first array of optical signals into a second array of optical signals. The method also includes nonlinearly transforming the second array of optical signals using an optical nonlinearity unit, in optical communication with the optical interference unit, so as to generate a third array of optical signals. The method further includes detecting the third array of optical signals.

In yet another example, an optical neural network includes an array of input waveguides to receive a first array of optical signals. The network also includes a plurality of interconnected Mach-Zehnder interferometers (MZIs), in optical communication with the array of input waveguides, to linearly transform the first array of optical signals into a second array of optical signals via interference among the first array of optical signals. Each MZI in the plurality of MZIs includes a first phase shifter configured to change a splitting ratio of the MZI and a second phase shifter configured to shift a phase of one output of the MZI. The network also includes an array of saturable absorbers, in optical communication with the plurality of interconnected MZIs, to nonlinearly transform the second array of optical signals into a third array of optical signals. Each saturable absorber in the array of saturable absorbers receives a corresponding optical signal in the second array of optical signals. The network further includes a detector array, in optical communication with the optical nonlinearity unit, to detect the third array of optical signals.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 6A and 6B illustrate optical bistability that can be used for the optical nonlinearity unit in an optical neural network substantially similar to the one shown in FIG. 1.

FIGS. 9A-9D illustrate an optical neural network using an optical nonlinearity unit including a ring resonator.

FIG. 13A shows an optical micrograph of an experimentally fabricated, 22-mode on-chip optical interference unit.

FIG. 13B is a schematic illustration of the optical neural network shown in FIG. 13A.

FIG. 13C is a schematic illustration of a single phase shifter used in MZIs in the optical neural network shown in FIG. 13A.

DETAILED DESCRIPTION

Overview

Optical neural networks (ONNWs) offer a promising way to overcome the limitations of computation efficiency and power consumption in microelectronic and hybrid optical-electronic implementations. An ONNW (and an artificial neural network in general) usually includes an input layer, at least one hidden layer, and an output layer. In each layer, information propagates through the neural network via linear combination (e.g. matrix multiplication) followed by a nonlinear activation function applied to the result of the linear combination. In training an artificial neural network model, data can be fed into the input layer, and the output is calculated through the forward propagation step. Then the parameters can be optimized through the back propagation procedure. The weighting parameters of each synapse (i.e., matrix entry) are optimized through the back propagation procedure.

In an ONNW, linear transformations (and certain nonlinear transformations) can be performed at the speed of light and detected at rates exceeding 100 GHz in photonic networks, and in some cases, with minimal power consumption. For example, a common lens can perform Fourier transform without any power consumption, and certain matrix operations can also be performed optically without consuming power. However, implementing such transformations with bulk optical components (e.g., fibers and lenses) can be challenging due to the lack of phase stability and the difficulty of integrating a large number of neurons (e.g., on the order to millions of neurons) in a network. Integrated photonics can solve this problem by providing a scalable architecture for large, phase-stable optical transformations.

Apparatus and methods described herein employ an on-chip, coherent, optical neuromorphic computing technique based on photonic integrated circuits. Generally, computations in the neuromorphic computing technique can be decomposed into a series of linear and nonlinear transformations to input optical signals. In this technique, matrix multiplication (i.e., linear transformation) is implemented using one or more optical interference units, which can apply an arbitrary weighting matrix multiplication $\omega_i$ to an ith signal in the input optical signals. Nonlinear activation is realized by an optical nonlinearity unit, which can be based on nonlinear optical effects, such as saturable absorption.

Optical neural networks based on photonic integrated circuits have several advantages. First, the high speeds, high bandwidth, and low cross-talk achievable in photonics are well suited to ultrafast artificial neural network processors. In addition, the high wall-plug efficiencies of photonic devices allows such implementations to match or outperform equivalent electronic systems with low energy usage. With existing technologies in quantum optical devices and on-chip nano-photonic circuit fabrication, it is feasible to design a viable on-chip ONNW architecture.

Figure 1:
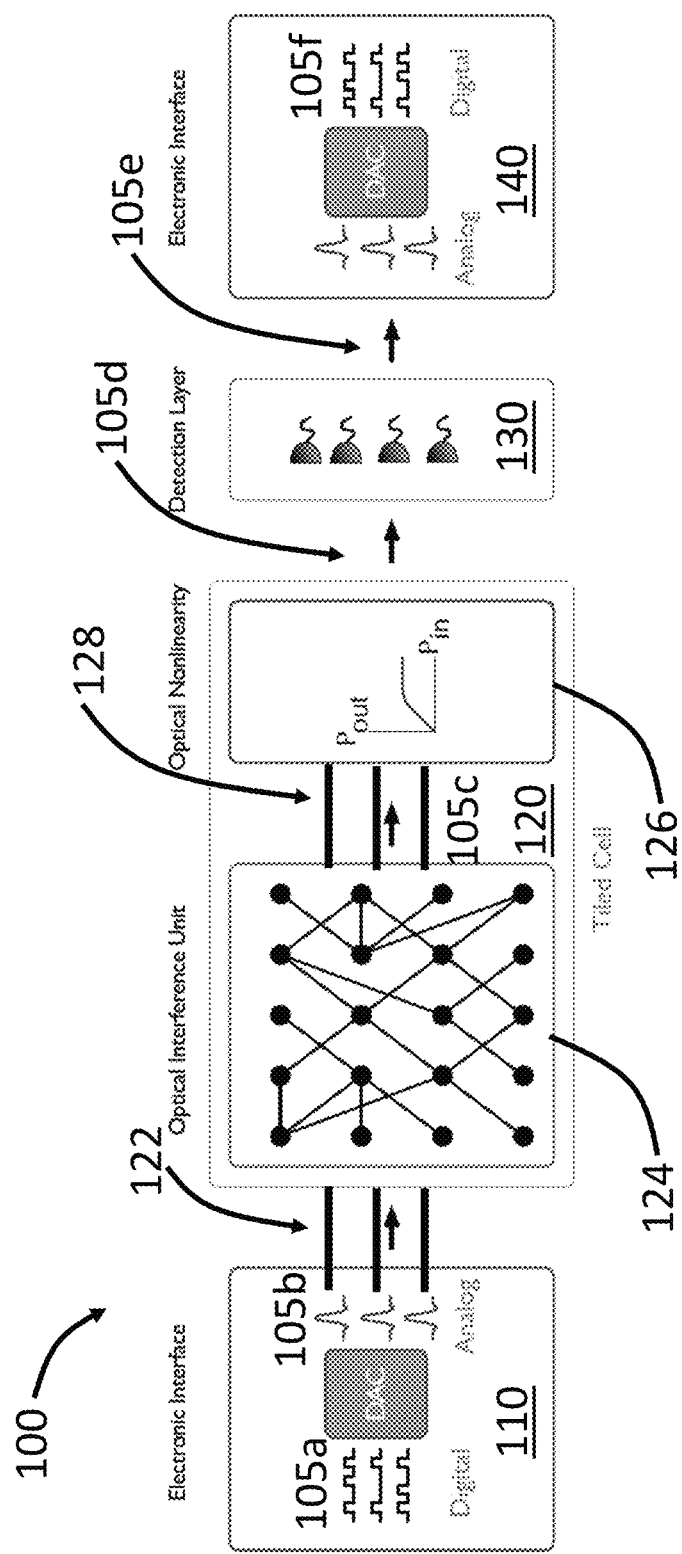
FIG. 1 shows a schematic of an optical neural network based on photonic integrated circuits.

FIG. 1 shows a schematic of an optical neural network 100 based on photonic integrated circuits. The network 100 includes an electronic interface 110 to encode digital signals 105a, such as image signals for image recognition or voice signals for voice recognition, into an array of optical signals 105b. Various encoding schemes can be used here. For example, the digital signals 105a can be encoded into the polarizations of the optical signals 105b. In another example, the digital signals 105a can be encoded into the phase (or time delay) of the optical signals 105b. In yet another example, the digital signals 105a can be encoded into the intensity of the optical signals 105b. In yet another example, the digital signals 105a can be encoded into the wavelengths of the optical signals 105b.

The array of the optical signals 105b are guided to a photonic integrated circuit (PIC) 120 via an array of input waveguides 122. As used herein, the term "waveguides" can include any structure that can guide optical signals in a confined manner. For example, a waveguide can include a fiber, a semiconductor waveguide fabricated in a substrate, a photonic crystal structure configured to guide optical signals, or any other appropriate structure. The PIC 120 includes an optical interference unit 124 (also referred to as a matrix product unit 124) to perform a linear transformation of the array of the optical signals 105b. In other words, the array of optical signals 105b is treated as a vector (e.g., X) and the optical interference unit 124 functions as a matrix (e.g., M) that multiplies the vector, i.e., MX. The matrix multiplication generates optical signals 105c, which are guided via an array of output waveguides 128 to an optical nonlinearity unit 126.

In some cases, the optical interference unit 124 connects each input waveguide 122 to each and all of the output waveguides 128. In other words, the input waveguides 122 and the output waveguides 128 are fully connected. In some cases, the optical interference unit 124 connects a subset of input waveguides in the array of input waveguides 122 to each and all of a subset of output waveguides in the output waveguides 128. For example, two input waveguides in the array of input waveguides 122 can be fully connected with two output waveguides in the array of input waveguides 128. Any other number of fully connected waveguides can also be used in practice.

The optical nonlinearity unit 126 is configured to perform a nonlinear activation function on the optical signals 105c and generate optical signals 105d. A detector array 130 is employed in the network 100 to detect the optical signals 105d and generated detected signals 105e. The detected signals 105e are converted back to a large number of parallel electronic signals 105f by the electronic interface 140.

Figure 2A:
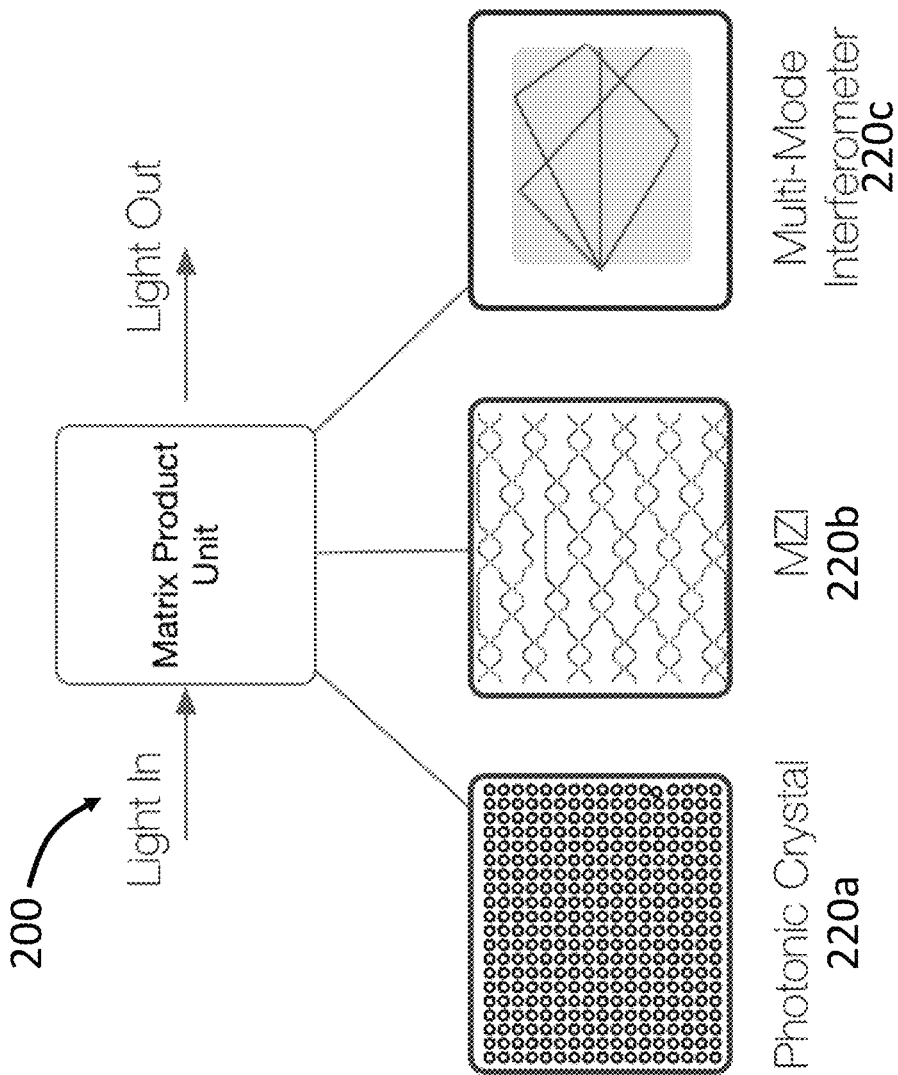
FIGS. 2A and 2B show schematics of optical interference units 200 that can be used in an optical neural network substantially similar to the one shown in FIG. 1.
Figure 2B:
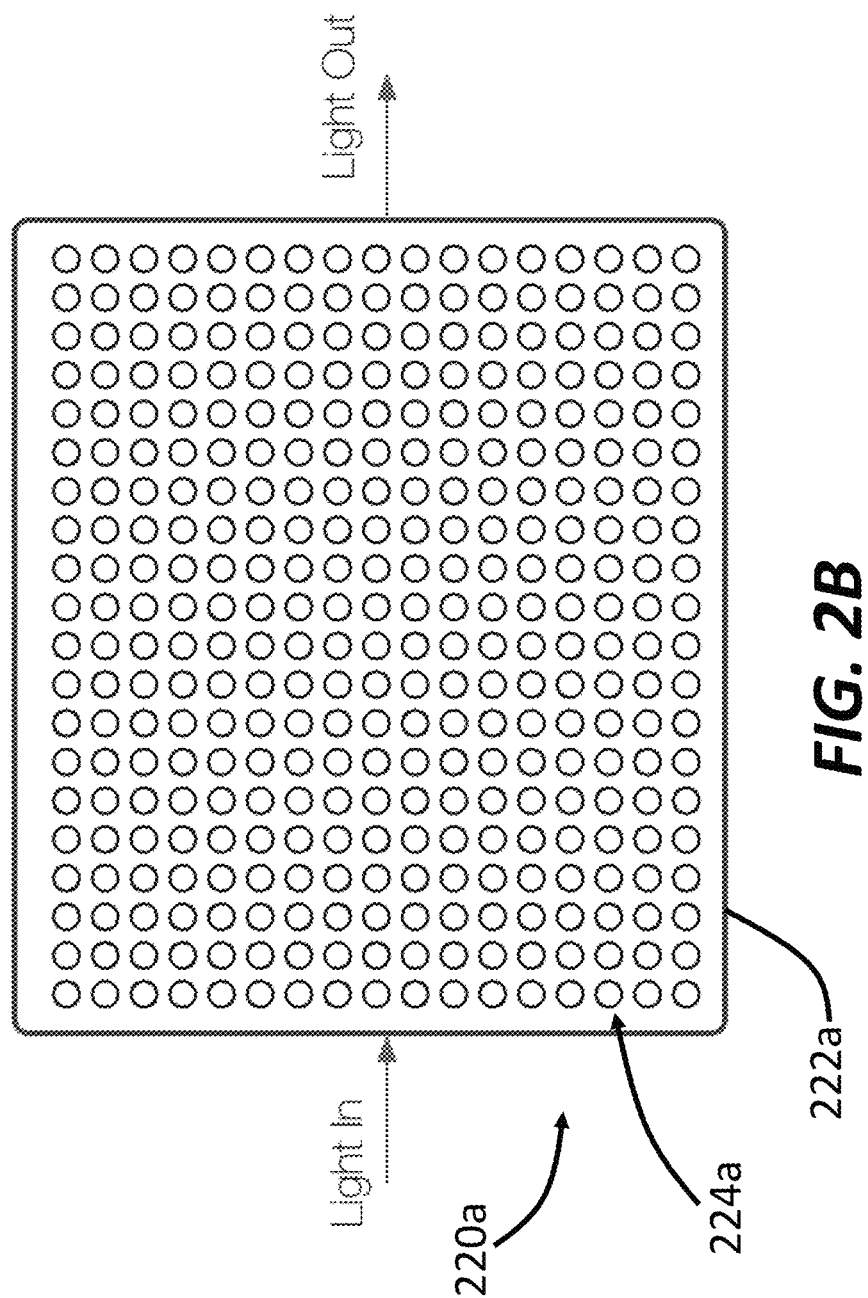

FIGS. 2A and 2B show schematics of optical interference units 200 that can be used in the optical neural network 100 described above. Generally, the optical interference unit 200 functions to perform a matrix multiplication to an array of optical signals. For illustrative purposes, three examples of optical interference units 220a, 220b, and 220c are shown in FIG. 2A. In practice, any other type of interference unit that can perform linear transformation can be used.

In one example, the optical interference unit 200 can include a photonic crystal 220a. As illustrated in FIG. 2B, the photonic crystal 220a includes a substrate 222a and an two-dimensional (2D) array of holes 224b defined in the substrate 222a. The dimensions of the holes 224a (e.g., diameters and pitch) and the material of the substrate 222a can be configured to cause interference of optical signals delivered into the photonic crystal 220a. More information about using photonic crystals for optical signal interference can be found in U.S. Patent Application Publication No. US 20100226608 A1, entitled "Multimode interference coupler for use with slot photonic crystal waveguides," which is hereby incorporated herein by reference in its entirety.

In some cases, the optical interference unit 200 can include one photonic crystal 220a. In other cases, the optical interference unit 200 can include an array of photonic crystals that can receive an array of N optical modes, perform a linear transformation on the received optical modes, and then output an array of N optical modes.

In FIG. 2B, the photonic crystal 220a includes an array of holes 224a. Other configurations can also be used. For example, the photonic crystal 220a can include an array of micro-disks disposed on the substrate 222a. In another example, the photonic crystal 220a can include a stack of thin films, in which case the photonic crystal 220a can be a one-dimensional (1D) photonic crystal. The length of the photonic crystal 220a can be substantially equal to or greater than 20 μm (e.g. about 20 μm, about 30 μm, about 50 μm, about 100 μm, about 200 μm, about 30 μm, about 500 μm, or greater, including any values and sub ranges in between). The diameter of each hole 224a can be, for example, substantially equal to or greater than 20 nm (e.g., about 20 nm, about 30 nm, about 50 nm, about 100 nm, about 200 nm, about 300 nm, or greater, including any values and sub ranges in between). In some cases, the pitch d of the array of holes 224a can be substantially equal to the wavelength λ of the optical signals propagating in photonic crystal 220a divided by the refractive index $n_p$ of the photonic crystal 220a, i.e., $d=\lambda/n_p$. In some cases, substrate 222a can be made of silicon, or any other appropriate material.

The photonic crystal 220a can be coated with a phase change material to change the optical path length of the photonic crystal 220a. The change of the optical path length can in turn change the interference of the optical signals propagating in the photonic crystal 220a. This can adjust the weight parameter of each hidden layer in the resulting optical neural network.

In another example, the optical interference unit 200 includes an array of interconnected Mach-Zehnder Interferometers (MZIs) 220b. Each MZI splits input optical signals into a first arm and a second arm and then combines the optical signals from the two arms for interference. Each MZI further includes a first phase shifter configured to change a splitting ratio of the MZI and a second phase shifter configured to shift a phase of one output of the MZI. More details of using MZIs in the optical interference unit 200 are described below, with reference to FIGS. 4A-4D.

In yet another example, the optical interference unit 200 can include a multimode interferometer (MMI) 220c. An MMI can include an array of single mode waveguides to receive input optical signals and a multimode waveguide for the received optical signals to interference with each other. The multimode waveguide has many guided modes, each of which has a different propagation constant. Because the modes are eigenmodes, they propagate independently from one another. When a multimode interference is excited by the input optical signals, the field profile can be decomposed into the eigenmodes. Even though there is usually no exchange of energy between these eigenmodes, they propagate at different velocities, resulting in an interference pattern that changes along the length of the multimode waveguide. More information about multimode interference can be found in U.S. Pat. No. 9,097,852 B2, entitled "Multi-mode interference device," which is hereby incorporated herein by reference in its entirety.

Figure 3:
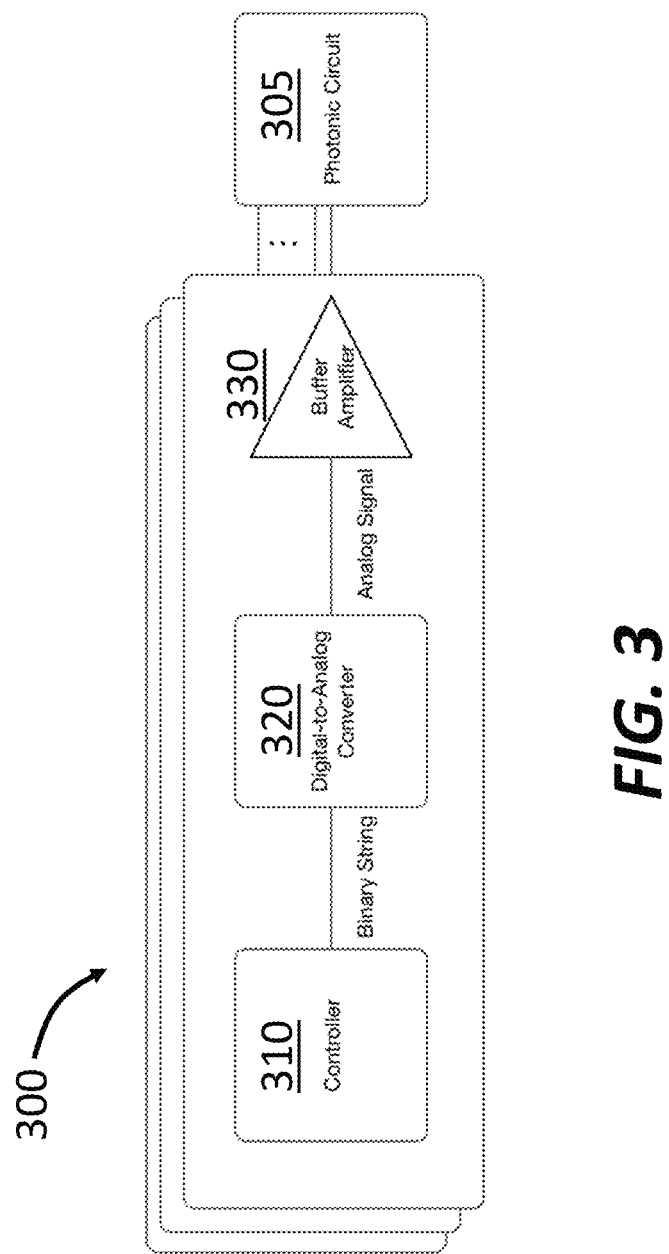
FIG. 3 shows a schematic of control circuitry that can be used in an optical neural network substantially similar to the one shown in FIG. 1.

FIG. 3 shows a schematic of control circuitry 300 that can be used in the optical neural network 100 shown in FIG. 1. The control circuitry 300 includes a controller 310 to provide digital control signals that are converted by a digital-to-analog converter (DAC) 320 into analog control signals. A buffer amplifier 330 is used in the control circuitry 300 to amplify the analog control signals before applying the signals to a photonic integrated circuit 305. The photonic integrated circuit 305 can be substantially identical to the photonic integrated circuit 120 shown in FIG. 1 and described above.

In practice, the control circuitry 300 can be used to train an optical neural network including the photonic integrated circuit 305. For example, the photonic integrated circuit 305 can include an array of interconnected MZIs, each of which includes one phase shifter to control the splitting ratio of the MZI and another phase shifter to control the phase of the output. The control circuitry 300 can then control the phase imposed by each phase shifter so as to implement different matrix transformations. In other words, the control circuitry 300 can change elements M(i,j) (also referred to as weight parameters) of the transformation matrix M implemented by the optical interference unit in the photonic integrated circuit 305.

During training, a set of test data points with an expected output can be sent to the optical neural network. The expected output is then compared with the actual output. In the event of any discrepancy, the control circuitry 300 can then change the phase setting of the photonic integrated circuit 305 so as to cause the photonic integrated circuit 305 to produce the expected result. After the phase setting that produces the expected result is determined, the optical neural network can then be used to process unknown data points.

Alternatively, weight parameters can be trained separately on an electronic computer. Then the weight parameters can be programmed to the optical neural network through thermal phase shifters (e.g., when MZIs are used for the optical interference unit) or hard coded to the optical neural network through phase changing materials.

Optical Neural Networks Using Mach-Zehnder Interferometers

Figure 4A:
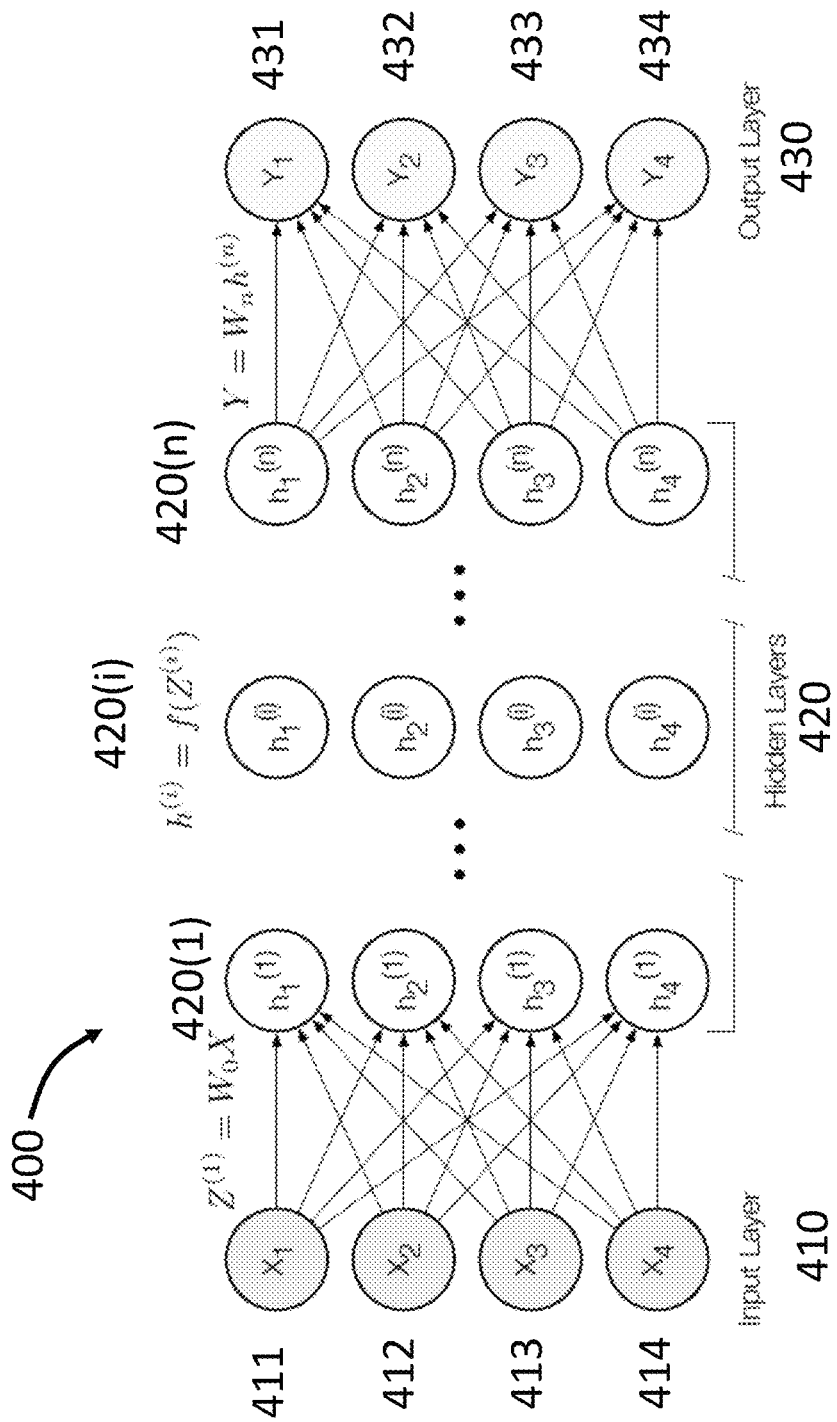
FIG. 4A shows a schematic of an optical neural network including one input layer, multiple hidden layers, and an output layer.
Figure 4B:
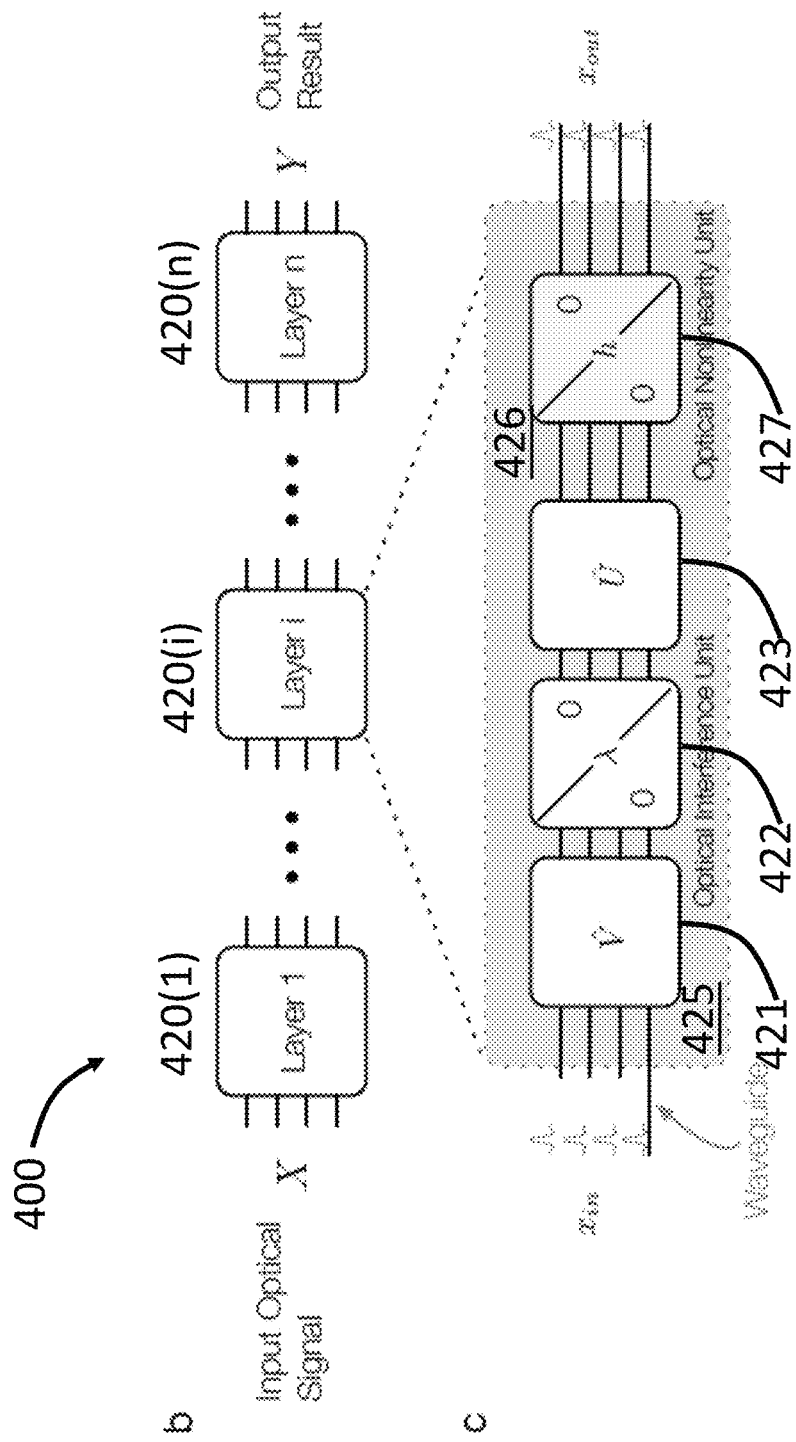
FIG. 4B shows a schematic of a hidden layer in the optical neural network shown in FIG. 4A implementing SVD decomposition.
Figure 4C:
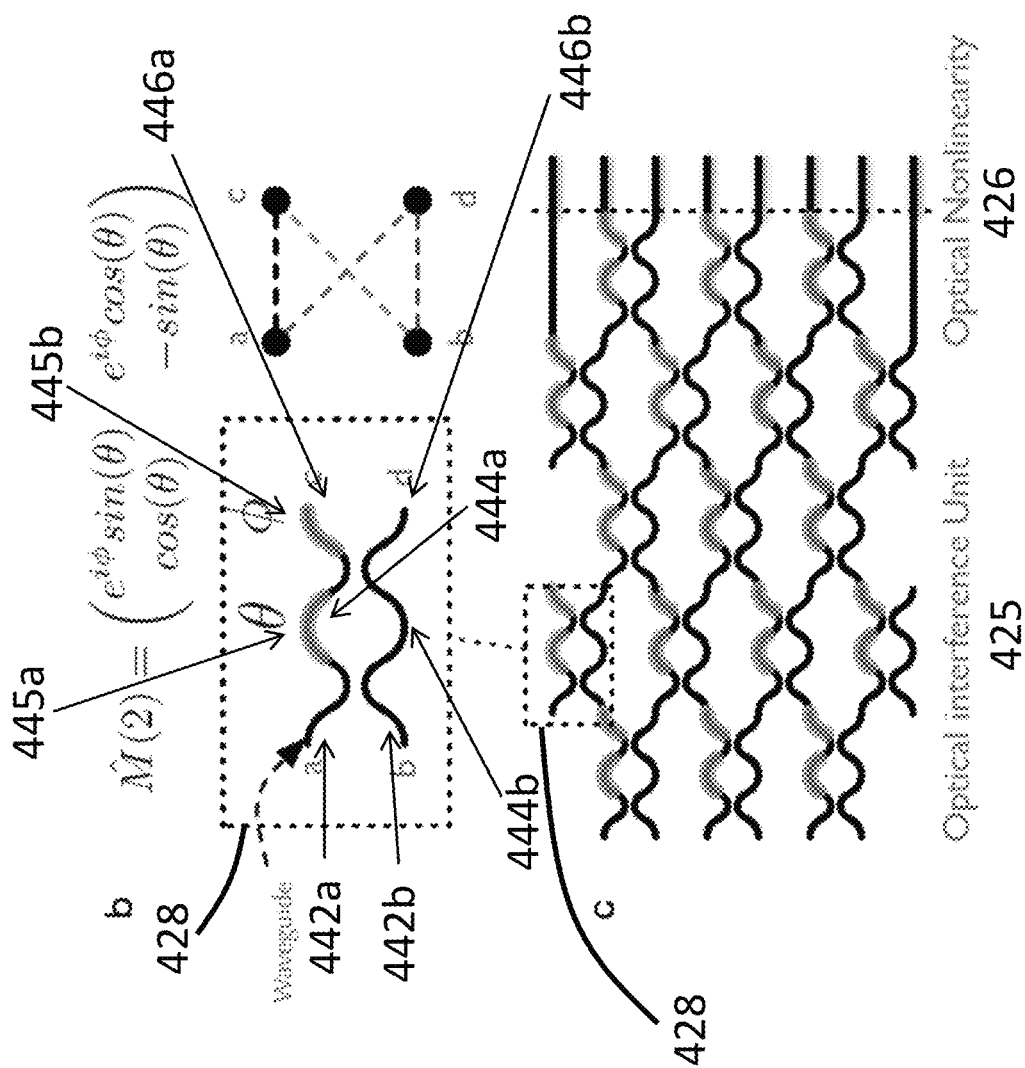
FIG. 4C shows a schematic of a hidden layer in the optical neural network shown in FIG. 4A using Mach-Zehnder interferometers (MZIs) for optical linear transformation.

FIGS. 4A-4C show a schematic of an optical neural network 400 using Mach-Zehnder interferometers (MZIs) for optical linear transformation. FIG. 4A shows that the optical neural network 400 includes an input layer 410, a sequence of hidden layers 420(1), 420(2), . . . , and 420($n$) (collectively referred to as hidden layers 420), and an output layer 430. Each layer includes multiple neurons (illustrated as circles in FIG. 4A). For example, the input layer 410 includes four neurons 411, 412, 413, and 414 (also referred to as nodes). In some cases, each node, as indicated by circles in FIG. 4A, can include a waveguide (e.g., the input waveguides 122) and the arrows between the columns of circles can be photonic circuits to perform linear and/or nonlinear transformations (e.g., the optical interference unit 124 and/or the optical nonlinearity unit 126 in FIG. 1). Similarly, the output layer 430 includes four neurons 431, 432, 433, and 434. In practice, any other number of neurons can be used for each layer. As can be seen in FIG. 4A, each neuron in the input layer 410 is connected to all of the four neurons in the first hidden layer 420(1). Similarly, each neuron in the first hidden layer 420(1) is connected to all of the four neurons in the second hidden layer 420(2), and so on.

In the optical neural network 400, in each layer (e.g., 420), information propagates by linear combination (e.g. matrix multiplication) followed by the application of a nonlinear activation function. In this network 400, vectors of the optical signals can be represented as $$Z_j^{(i)} = |E_j|^2 \quad (1)$$

where $E_j$ is the electric field at waveguide j (depicted as a pulse in FIG. 4B). Matrix-vector products $Z^i = W^{i-1}X$ are performed by an optical interference unit and activation functions $f(Z(i))$ are implemented using an optical nonlinearity unit. The unit cell of the network 400, the optical interference and nonlinearity units, can be tiled to implement a deep learning network.

In the network 400, a matrix-vector product and nonlinear activation can be evaluated every Ln/c seconds, where L is the physical length of the network 400, n is the index of refraction, and c is the speed of light. For example, the network 400 can have a length L of about 1 cm with a refractive index of about 3, thereby providing an evaluation time of about 100 ps (also referred to as forward propagation time). During this forward-propagation time, a total number of D input vectors can propagate through the network 400 giving a total bandwidth of Dc/nL. Accordingly, the resulting computation at clock rates can readily exceed tens of gigahertz. This clock rate may be limited only by the rate at which optical signals can be converted into electrical signals (e.g., about 100 GHz in current technology).

In addition to ultra-fast forward-propagation, the computational time associated with evaluating matrix vector products scales linearly with the matrix dimension N. Increasing the dimension of a matrix from N to N+1 corresponds to adding one waveguide to the network 400. The number of operations per second for this system is given as $R = 2m \cdot N^2 \cdot 10^{11}$ operations/s, where m is the number of layers in the neural network 400.

FIG. 4B shows each hidden layer 420 includes an optical interference unit 425 and an optical nonlinearity unit 427 to implement the singular value decomposition (SVD) scheme so as to achieve an arbitrary linear transformation to input optical signals. In a SVD scheme, a general, real-valued matrix (M) can be decomposed as M=USV*, where U is an m×m unitary matrix, S is a m×n diagonal matrix with non-negative real numbers on the diagonal, and V* is the complex conjugate of an n×n unitary matrix V. The optical interference unit 425 shown in FIG. 4B includes a first MZI array 421 to implement matrix multiplication using matrix V, an array of attenuators 422 (or amplifiers) to implement matrix multiplication using matrix S, and a second MZI array 423 to implement matrix multiplication using matrix U. In this manner, the optical interference unit 425 can apply a matrix multiplication to input signal using matrix M, where M=USV*.

Matrix multiplication implemented in this manner consumes, in principle, no power. This leads to high energy efficiency of the neural network 400.

The diagonal entries $\lambda_i$ of matrix S are usually known as the singular values of the matrix M. A common convention is to list the singular values in descending order. In this case, the diagonal matrix S is uniquely determined by M. The diagonal matrix S can be obtained using a set of optical amplifiers. An optical amplifier is a device that amplifies an optical signal directly, without converting the optical signal to an electrical signal. An optical amplifier can include a laser with or without an optical cavity (e.g., a travelling wave amplifier, or a single-pass amplifier), or one in which feedback from the cavity is suppressed. In the optical neural network 400, each optical amplifier is applied to an output node and amplifies or attenuate the signal by a constant factor $\lambda_i$.

The optical nonlinearity unit 426 can include an array of saturable absorbers 427. Alternatively, the optical nonlinearity unit 426 can include an array of bistable materials. In general, for an input intensity $I_{in}$, the optical output intensity from the optical nonlinearity unit 426 is given by a nonlinear function $I_{out} = f(I_{in})$.

FIG. 4C shows a schematic of the optical interference unit 425 and the optical nonlinearity unit 426. The optical interference unit 425 includes interconnected MZIs 428. Each MZI 428 includes two input waveguides 442a and 442b, two arms 444a and 444b, and two output waveguides 446a and 446b. Each MZI 428 also includes a phase shifter 445a disposed on one arm 444a and another phase shifter 445b disposed on one output waveguide 446a.

Each phase shifter can be implemented with a heater that heats the waveguide of electrodes that apply an electric field to the waveguides. The phase shifter 445a applies a phase θ and can control the splitting ratio between signals delivered by the two output waveguides 446a and 446b. The phase shifter 445b applies a phase φ and can control the phase delay between signals delivered by the two output waveguides 446a and 446b.

With this configuration, each MZI can perform a unitary transformation to optical signals received by the two input waveguides 442a and 442b, and the unitary transformation can be written as:

$$M(2) = \begin{pmatrix} e^{i\phi}\sin(\theta) & e^{i\phi}\cos(\theta) \\ \cos(\theta) & -\sin(\theta) \end{pmatrix} \quad (2)$$

Figure 4D:
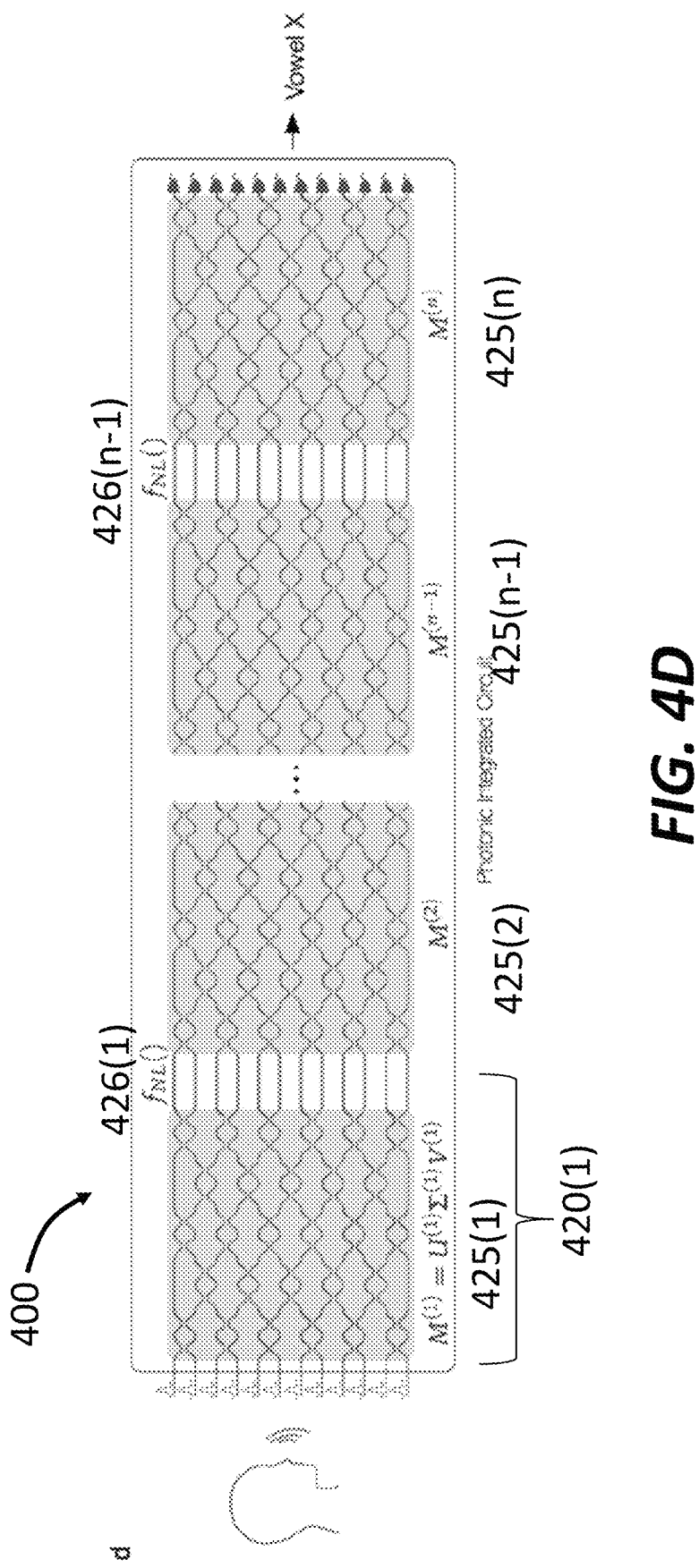
FIG. 4D shows a schematic of an optical neural network using interconnected MZIs and implementing vowel recognition.

FIG. 4D shows the optical neural network 400 with illustrations of the optical interference units 425 and the nonlinearity units 426. Each optical interference unit 425 includes interconnected MZIs and each nonlinearity unit 426 includes an array of waveguides containing saturable absorbers or bi-stable materials. One optical interference unit 425 and one nonlinearity unit 426 form one layer 420 to propagate the optical signals. In practice, the sequence of layers 420 forms a photonic integrated circuit, which can receive, for example, voice signals from a speaker and then process the received voice signals to recognize the content of the voice signals, i.e., speech recognition.

Optical Nonlinearity Units

The optical nonlinearity unit (e.g., 126 in FIG. 1 or 426 in FIGS. 4A-4D) is employed in the neuromorphic technique described herein to apply the nonlinear activation function. Specifically, the optical nonlinearity unit can use up an input power $I_{in}$ into the output power through a nonlinear function $f$ such that: $I_{out}=f(I_{in})$.

Figure 5:
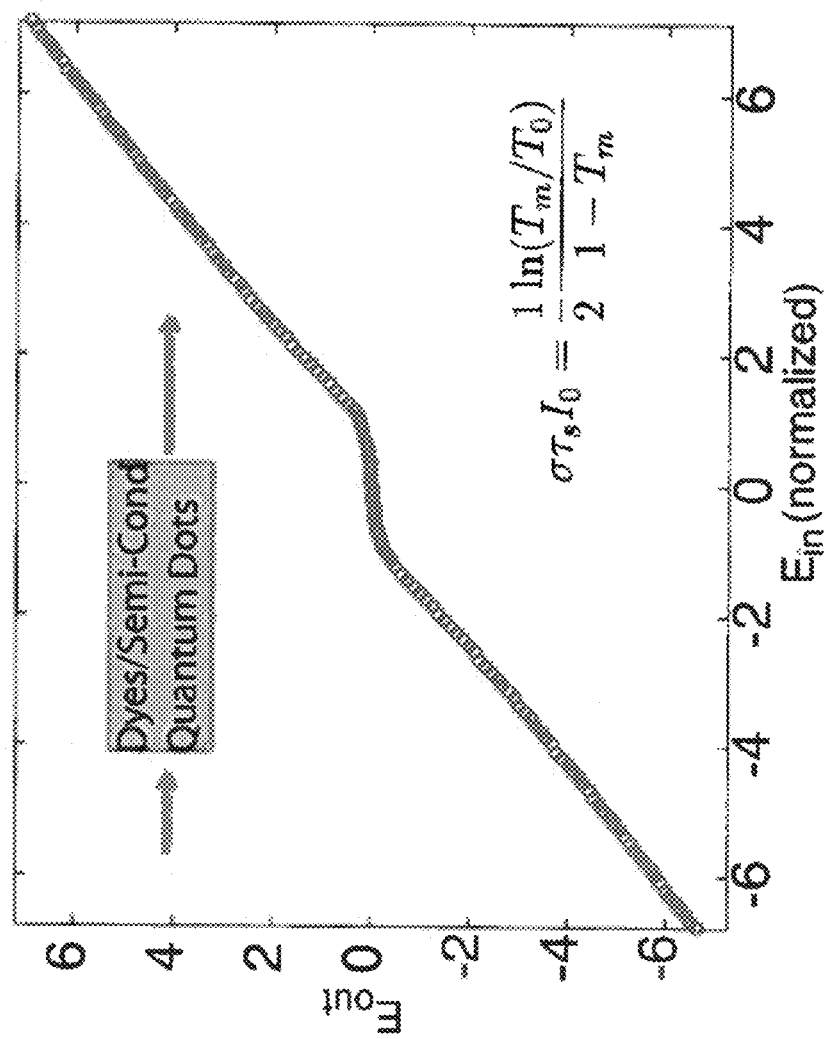
FIG. 5 shows the optical response of a nonlinearity unit based on saturable absorption.

In one example, the optical nonlinearity can be based on saturable absorption. Without being bound by any particular theory or mode of operation, the nonlinear function of a saturable absorber can be written as:

$$\sigma\tau_s I_0 = \frac{1}{2}\frac{\ln(T_m/T_0)}{1-T_m} \quad (3)$$

where $\sigma$ is the absorption cross section, $\tau_s$ the radiative lifetime of the material that forms the absorber, $T_m$ is the maximum transmittance of the saturable absorber, $T_0$ the initial transmittance, and $I_0$ the peak incident intensity. FIG. 5 shows optical response of a nonlinearity unit based on saturable absorption. The saturable absorber used in this unit can be, for example, dyes or semiconductor quantum dots.

FIGS. 6A and 6B illustrate optical bistability that can be used for the optical nonlinearity unit. FIG. 6A shows a schematic of a photonic crystal 600 that has optical bistability. The photonic crystal 600 includes an array of high-index dielectric rods 620 (e.g., $n_H \sim 3.5$) embedded in a low-index dielectric substrate 610 (e.g., $n_L \sim 1.5$). In some cases, the pitch of the array of rods 620 is denoted by a, and the radius of each rod in the array of rods 620 is $r=a/4$.

FIG. 6B shows the optical response of the photonic crystal shown in FIG. 6A. Without being bound by any particular theory or mode of operation, the nonlinear relationship of the photonic crystal 600 can be written as:

$$\frac{I_{out}}{I_{in}} = \frac{1}{1+(I_{out}/I_0-\delta)^2} \quad (4)$$

where $I_0$ is the characteristic intensity of the photonic crystal 600, and $\delta$ is a parameter that depends on the geometry of the photonic crystal 600. More information on optical bistable photonic crystals can be found in Soljacic et al., "Optimal bistable switching in nonlinear photonic crystals," PHYSICAL REVIEW E 66, 055601 (R), 2002, which is hereby incorporated herein by reference in its entirety.

Figure 7:
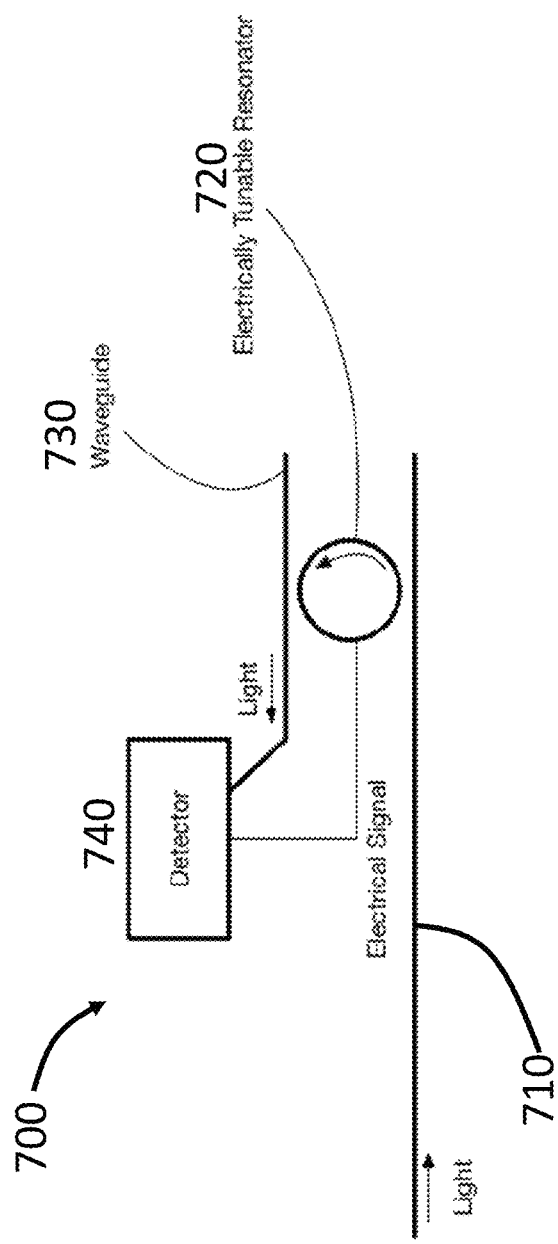
FIG. 7 shows a schematic of an optical nonlinearity unit including a tunable ring resonator.

FIG. 7 shows a schematic of an optical nonlinearity unit 700 using a tunable ring resonator 720. The unit 700 includes an input waveguide 710 to receive input light. The input waveguide 710 is evanescently coupled to the ring resonator 720. A probe waveguide 730 is also evanescently coupled to the ring resonator 720 to split a portion of the input light to a detector 740. Based on the detected signal, the detector 740 generates a control signal to tune the ring resonator 720. For example, the control signal can change the resonant wavelength of the ring resonator 720 so as to change the optical response of the ring resonator 720. The transmittance of the unit 700 also depends on the power of the input light so as to implement nonlinear activation functions in a neural network.

Figure 8:
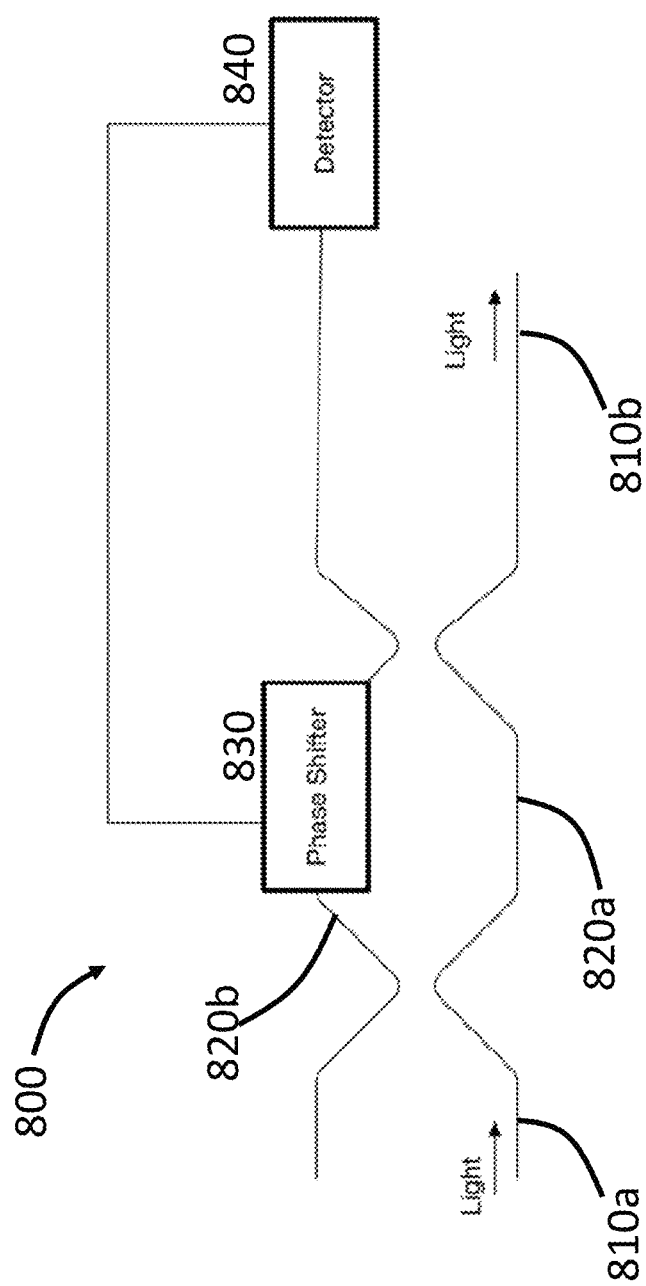
FIG. 8 shows a schematic of an optical nonlinearity unit including a Mach-Zehnder interferometer.

FIG. 8 shows a schematic of an optical nonlinearity unit 800 using a Mach-Zehnder Interferometer. The unit 800 includes an input waveguide 810a to receive input light and split the input light into two arms 820a and 820b. A phase shifter 830 is disposed on the arm 820b to apply an adjustable amount of phase shift. Light from the two arms 820a and 820b combine at an output waveguide 810b. A portion of the light propagating in the arm 820b is transmitted to and detected by a detector 840. Depending on the detected signal, the detector 840 can generate a control signal to control the amount of phase shift applied by the phase shifter 830.

FIGS. 9A-9D illustrate an optical neural network 900 using an optical nonlinearity unit 924 based on ring resonators. The optical neural network 900 includes an input layer 910, a sequence of hidden layers 920, an output layer 930, and a detection layer 940. Each hidden layer 920 includes an optical interference unit 922 and an optical nonlinearity unit 924.

FIG. 9B shows the schematic of the optical nonlinearity unit 924, which can be substantially similar to the optical nonlinearity unit 700 shown in FIG. 7 and described above. FIG. 9C is a plot of output power versus wavelength detuning and derivative of the ring resonator in the optical nonlinearity unit 924. FIG. 9D shows optical output power ($P_{out}$) versus input power ($P_{in}$) at various spectral detuning locations. A family of curves can be realized by configuring a single optical nonlinearity unit.

In the optical nonlinearity unit 924, light incident on an optical cavity is detected by a photodetector that subsequently drives the optical cavity off-resonance. This optoelectronic element can implement a range of high-speed nonlinear activation functions including ReLU and sigmoid, as shown in FIG. 9D. Different nonlinear functions can be selected by applying a bias voltage which shifts the Lorentzian transmission function (see FIG. 9C), thereby modifying the input-output power relation.

Recurrent Optical Neural Network

Figure 10:
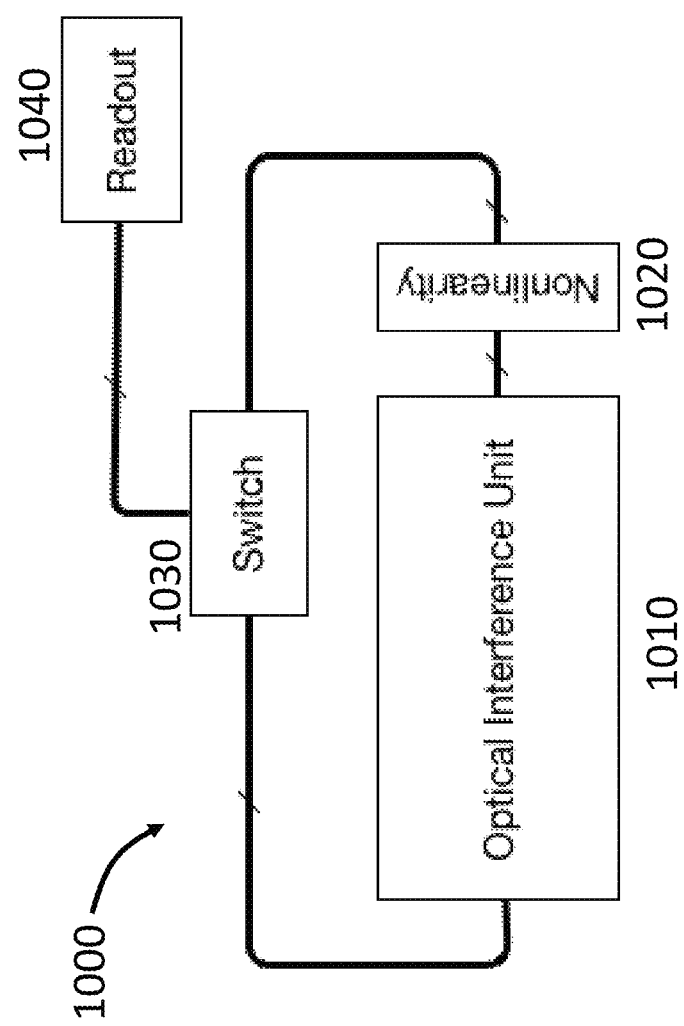
FIG. 10 shows a schematic of a recurrent optical neural network.

FIG. 10 shows a schematic of a recurrent optical neural network 1000 that can recycle optical signals at the output layer. The optical neural network 1000 includes an optical interference unit 1010 and an optical nonlinearity unit 1020 to form a hidden layer. Only one hidden layer is shown in FIG. 10, but multiple hidden layers can be used. At the output, the optical signals are transmitted to a switch 1030, which sends part of the received signals to a readout unit 1040 for detection and sends another part of the received signals back to the optical interference unit 1010 for another round of linear transformation (and then to the optical nonlinearity unit 1020 for nonlinear activation). By wrapping optical signals from the output layer of the optical neural network 1000 back to the input layer, the same physical hardware can be used to implement a much larger transformation with a smaller number of weights. This recurrent configuration can be used to efficiently construct a deep neural network, i.e., a neural network having a large number of hidden layers.

In one example, the optical signals at the output layer are sent directly back to the input layer for another round of transformations. In another example, the optical signals at the output layer can be converted into electrical signals, which are then sent to a light source (not shown). The electrical signals can be used as control signals to control the light source to deliver optical signals that are substantially similar to the optical signals at the output layer. In other words, the light source reproduces the output optical signals. This configuration may reduce possible losses or distortion during optical transmission back to the input layer.

Characterizations of Optical Neural Networks Using Photonic Integrated Circuits

Figure 11A:
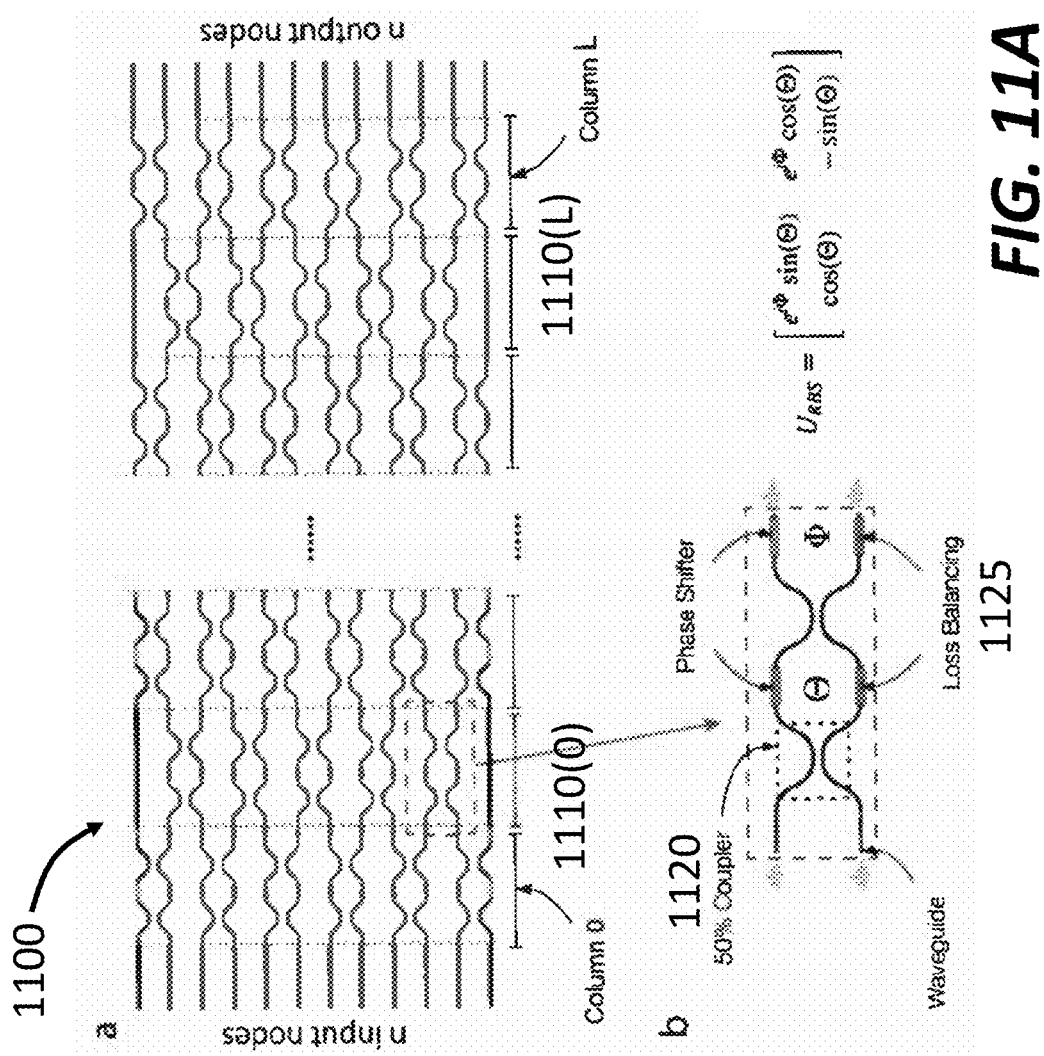
FIG. 11A shows a schematic of an optical neural network including multiple columns of interconnected MZIs.
Figure 11B:
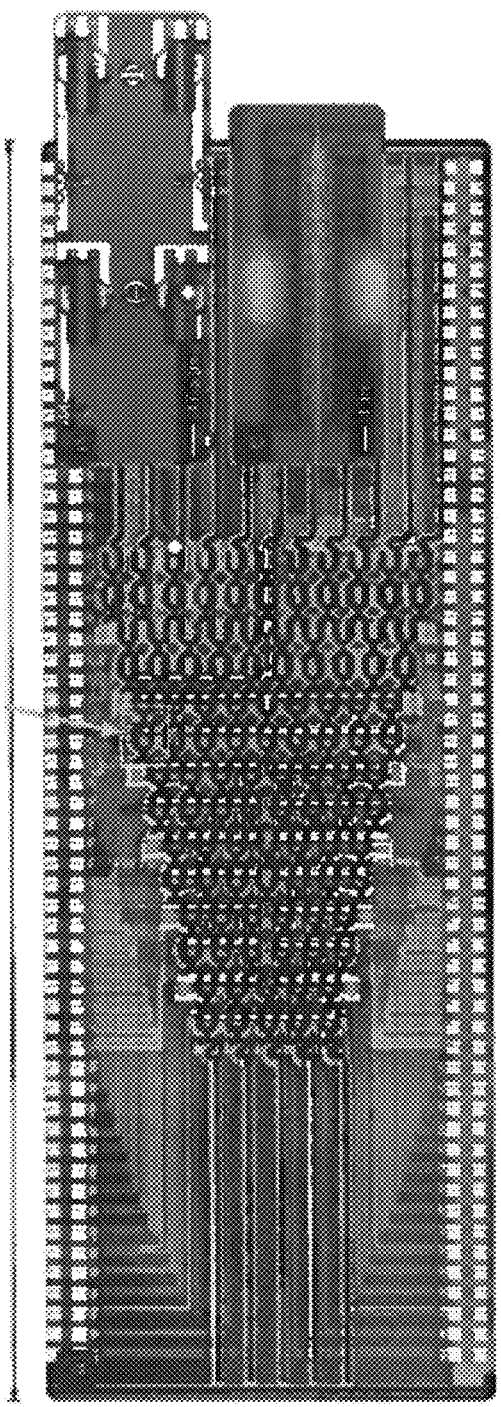
FIG. 11B is a microscope image of an experimentally fabricated 5×5 unit on-chip optical interference unit.

FIG. 11A shows a schematic of an optical neural network 1100 including multiple columns 1110(0), 1110(1), . . . and 1110(L) of interconnected MZIs. MZIs 1120 in each column 1110 are substantially similar to the MZIs shown in FIG. 4C, except that each MZI 1120 also includes two loss balancing phase shifters 1125. One loss balancing phase shifter is disposed on an arm of the MZI 1120 and the other loss balancing phase shifter is disposed on an output waveguide of the MZI 1120. FIG. 11B is a microscope image of an experimentally fabricated 5×5 unit on chip optical interference unit.

Figure 12:
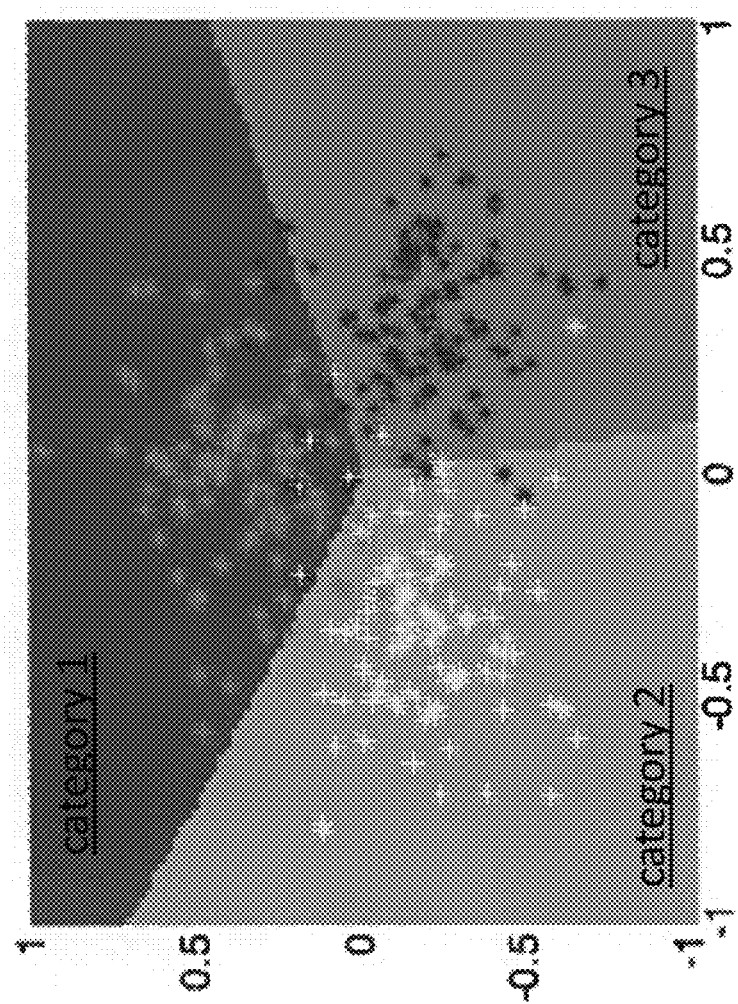
FIG. 12 shows decision boundaries for a simple 2 dimensional, 3 classes classification problem trained on the neural network shown in FIGS. 11A and 11B.

FIG. 12 shows decision boundaries for a simple 2 dimensional, 3 classes classification problem trained on the neural network shown in FIGS. 11A and 11B. Three categories of data are labeled in FIG. 12. In the training, batch forward propagation and backpropagation were used to optimize the parameters. FIG. 12 shows the classification result for the two input units, 3 output units, and 1 hidden layer, demonstrating an error rate less than 8%. In another round of training, 786 input units, 6 output units, and 1 hidden layer were used. Similarly, an error rate of less than 10% was achieved.

FIG. 13A shows an optical micrograph of an experimentally fabricated, 22-mode, on-chip optical interference unit. The physical region of the optical neural network program is highlighted in grey. The system acts as an optical field-programmable gate array, which can be a test bed for optical experiments. FIG. 13B is a schematic illustration of an optical neural network 1300 including the optical interference unit shown in FIG. 13A. The optical neural network 1300 realizes both matrix multiplication and amplification fully optically. FIG. 13C is a schematic illustration of a single phase shifter in the Mach-Zehnder Interferometer (MZI) and the transmission curve for tuning the internal phase shifter of the MZI.

The optical neural network 1300 includes an array of input waveguides 1305 to receive input modes and transmit the input modes to an SU(4) core 1310, which includes an array of interconnected MZIs. A non-unitary diagonal matrix multiplication core (DMMC) 1320 is coupled to the SU(4) core 1310. The DMMC 1320 includes a vertical array of MZIs. One input waveguide of each MZI is connected to the SU(4) core 1310. One output waveguide of each MZI is coupled to, for example, an optical nonlinearity unit, while the other output waveguide is blocked. Alternatively, the output waveguide can be coupled to a detector 1330 to detect a portion of signal delivered by the output waveguide. In this manner, the DMMC 1320 can change the total intensity (or power) of the optical signals received by the neural network 1300.

The SU(4) 1310 core implements operators U and V by a Givens rotations algorithm that decomposes unitary matrices into sets of phase shifters and beam splitters, while the DMMC 1320 implements operator S by controlling the splitting ratios of the DMMC interferometers to add or remove light from the optical mode relative to a baseline amplitude. In this manner, the combination of the SU(4) 1310 and the DMMC 1320 can perform a SVD decomposition.

A vowel recognition was performed on the neural network 1300. To prepare the training and testing dataset, 360 data points were used. Each data point includes four log area ratio coefficients of one phoneme. The log area ratio coefficients, or feature vectors, represent the power contained in different logarithmically-spaced frequency bands and are derived by computing the Fourier transform of the voice signal multiplied by a Hamming window function. The 360 data points were generated by 90 different people speaking 4 different vowel phonemes. Half of these data points was used for training and the remaining half was used to test the performance of the trained optical neural network 1300. The matrix parameters were trained with the standard back propagation algorithm using stochastic gradient descent method, on a conventional computer.

The coherent optical neural network 1300 is realized with a programmable nanophotonic processor including an array of 56 Mach-Zehnder interferometers (MZIs) and 213 phase shifting elements, as shown in FIG. 13A. Each interferometer includes two evanescent-mode waveguide couplers sandwiching an internal thermo-optic phase shifter to control the splitting ratio of the output modes, followed by a second modulator to control the relative phase of the output modes. By controlling the phase imparted by these two phase shifters, these MZIs perform all rotations in the SU(2) Lie group given a controlled incident phase on the two electromagnetic input modes of the MZI. The nanophotonic processor can be fabricated, for example, in a silicon-on-insulator photonics platform with the OPSIS Foundry.

The measured fidelity for the 720 optical interference units and DMMC cores used in the experiment was 99.8±0.003%. In this analog computer, fidelity was limited by practical non-idealities such as (1) finite precision with which an optical phase could be set using the custom 240-channel voltage supply with 16-bit voltage resolution per channel; (2) photodetection noise; and (3) thermal cross-talk between phase shifters, which effectively reduced the number of bits of resolution for setting phases. As with digital floating-point computations, values were represented to some number of bits of precision, the finite dynamic range and noise in the optical intensities causes effective truncation errors.

In this demonstration, the nonlinear transformation $I_{out}=f(I_{in})$ was implemented in the electronic domain by measuring optical mode output intensities on a photodetector array and injecting signals $I_{out}$ into the next stage. Here, $f$ modeled the mathematical function associated with a realistic saturable absorber (such as a dye, semiconductor or graphene saturable absorber or saturable amplifier) that could be directly integrated into waveguides after each optical interference stage of the circuit. For example, given an input intensity $I_0$, one can solve for $T_m(I_0)$ from Equation (3) above, and the output intensity can be calculated as $I_{out}=I_0 \cdot T_m(I_0)$.

After programming the nanophotonic processor to implement the optical neural network architecture, which includes 4 layers of optical interference units with 4 neurons on each layer, the neural network was used for a vowel recognition test set. The network correctly identified 138/180 cases (76.7%) compared to a simulated correctness of 165/180 (91.7%).

Figures 14A, 14B, 14C, 14D, 14E:
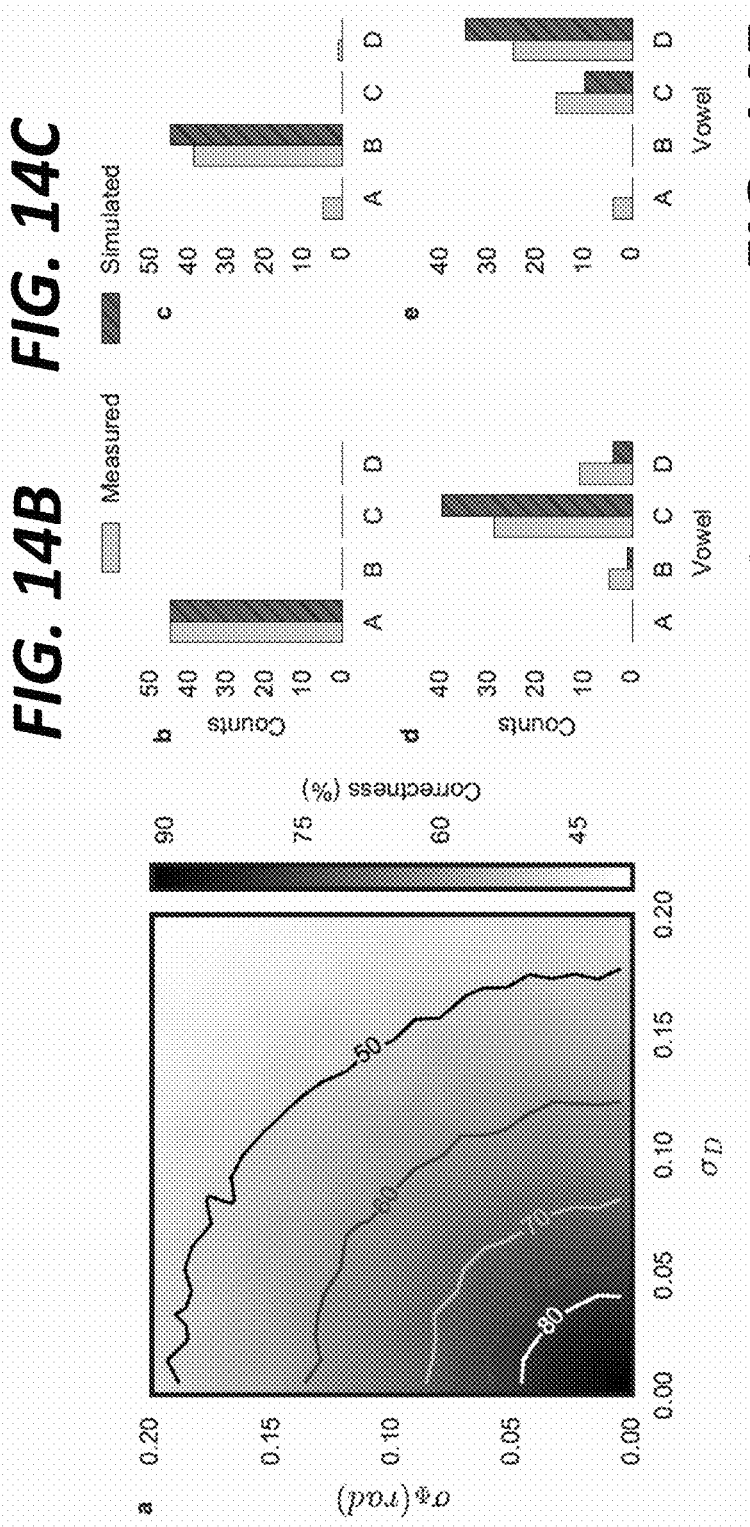
FIG. 14A shows correct rates for vowel recognition problem with various phase encoding errors ($\sigma_F$) and photodetection errors ($\sigma_D$).
FIGS. 14B-14E show simulated and experimental vowel recognition results for an error-free training matrix.

FIG. 14A shows correct rates for vowel recognition problem with various phase encoding errors ($\sigma_F$) and photodetection errors ($\sigma_D$), the definition of these two variables can be found in method section. The solid lines are the contours for different level correctness percentage. FIGS. 14B-14E show simulated and experimental vowel recognition results for an error-free training matrix. In FIG. 14B, vowel A was spoken. In FIG. 14C, vowel B was spoken. In FIG. 14D, vowel C was spoken. And in FIG. 14E, vowel D was spoken.

Since the optical neural network 1300 processes information in the analog signal domain, the architecture may be vulnerable to computational errors. Photodetection and phase encoding are the dominant sources of error in the optical neural network presented here. To understand the role of phase encoding noise and photodection noise in ONNW hardware architecture and to develop a model for its accuracy, the performance of the trained matrices was numerically simulated with varying degrees of phase encoding noise ($\sigma_F$) and photodection noise ($\sigma_D$). The distribution of correctness percentage vs $\sigma_F$ and $\sigma_D$ is shown in FIG. 14A, which serves as a guide to understanding experimental performance of the optical neural network.

Implementing higher precision analog-to-digital converters in the photo-detection array and voltage controller, can make the performance of the optical neural network to approach the performance of digital computers. Known techniques can be applied to engineer the photodiode array to achieve significantly higher dynamic range, such as using logarithmic or multi-stage gain amplifiers. Addressing these manageable engineering problems can further enhance the correctness performance of the optical neural network to achieve correctness percentages approaching those of error-corrected digital computers.

Processing big data at high speeds and with low power can be a central challenge in the field of computer science, and, in fact, a majority of the power and processors in data centers are spent on doing forward propagation (test-time prediction). Furthermore, low forward propagation speeds limit applications of artificial neural networks in many fields, including self-driving cars, which require high speed and parallel image recognition.

The optical neural network architecture described herein takes advantage of high detection rate, high-sensitivity photon detectors to enable high-speed, energy-efficient neural networks compared to state-of-the-art electronic computer architectures. Once the parameters have been trained and programmed on the nanophotonic processor, forward propagation computing is performed optically on a passive system. In the implementation, maintaining the phase modulator settings consumes only a small amount of power at the level of about 10 mW per modulator on average. In addition, the phases can be set with nonvolatile phase-change materials, which would take no power to maintain. With this change, the total power consumption can be limited only by the physical size, the spectral bandwidth of dispersive components (THz), and the photo-detection rate (e.g., about 100 GHz). In principle, such a system can be at least 2 orders of magnitude faster than electronic neural networks (which are restricted to GHz clock rates.)

In an optical neural network having N nodes and implementing m layers of N×N matrix multiplication and operating at a typical 100 GHz photo-detection rate, the number of operations per second of the system can be:

$$R = 2m \times N^2 \times 10^{11} \text{operations/s} \tag{5}$$

ONN power consumption during computation can be dominated by the optical power to trigger an optical nonlinearity and achieve a sufficiently high signal-to-noise ratio (SNR) at the photodetectors. In optical nonlinearity units, it can be assumed that the threshold power p to trigger storable absorption is about 1 mW/cm$^2$. For example, dyes can have a threshold power at about 0.3 mW/cm$^2$ to about 1 mW/cm$^2$. Graphene can have a threshold power of about 0.5 mW/cm$^2$ to about 0.8 mW/cm$^2$.

Since the cross section A for the waveguide is on the order of about 0.2 μm×0.5 μm, the total power to run the system is therefore estimated to be: P~N mW. Therefore, the energy per operation of the optical neural network can scale as R/P=2m×N×10$^{14}$ operations/J (or P/R=5/mN fJ/operation). Almost the same energy performance and speed can be obtained if optical bistability is used instead of saturable absorption as the enabling nonlinear phenomenon. Even for very small neural networks, the above power efficiency is already at least 3 orders of magnitude higher than that in conventional electronic CPUs and GPUs, where P/R~1 pJ/operation (not including the power spent on data movement), while conventional image recognition tasks usually involves tens of millions of training parameters and thousands of neurons (mN~10$^5$). These considerations suggest that the optical neural network described herein can be tens of millions times more efficient than conventional computers for standard problem sizes. In fact, the larger the neural network, the larger the advantage of using optics, because evaluating an N×N matrix in electronics uses O(N$^2$) energy, while in optics, it uses no energy in principle.

Optical neural networks also allow new methods to train artificial neural network parameters. On a conventional computer, parameters are trained with back propagation and gradient descent. However, for certain artificial neural networks, where the effective number of parameters substantially exceeds the number of distinct parameters (including recurrent neural networks (RNN) and convolutional neural networks (CNN)), training using back propagation can be notoriously inefficient. Specifically the recurrent nature of RNNs gives them effectively an extremely deep artificial neural network (depth=sequence length), while in CNNs the same weight parameters are used repeatedly in different parts of an image for extracting features.

In optical neural networks, an alternative approach to directly obtain the gradient of each distinct parameter can be implemented without back propagation. This approach can use forward propagation on an optical neural network and the finite difference method.

In this approach, the gradient for a particular distinct weight parameter $\Delta W_{ij}$ in an artificial neural network can be obtained with two forward propagation steps that compute $J(W_{ij})$ and $J(W_{ij}+\delta_{ij})$, followed by the evaluation of $\Delta W_{ij}=J(W_{ij}+\delta_{ij})-J(W_{ij})/\delta_{ij}$ (this step only takes two operations). On a conventional computer, this scheme is not favored because forward propagation (evaluating J(W)) is usually computationally expensive. In an optical neural network, however, each forward propagation step is computed in constant time (limited by the photodetection rate which can exceed 100 GHz), with power consumption that is only proportional to the number of neurons. Furthermore, with this on-chip training scheme, one can readily parametrize and train unitary matrices.

Regarding the physical size of the proposed optical neural network, current technologies are capable of realizing optical neural networks exceeding the 1000 neuron regime. For example, photonic circuits with up to 4096 optical components can be manufactured. 3-D photonic integration can enable even larger optical neural networks by adding another spatial degree of freedom. Furthermore, by feeding in input signals (e.g., an image) via multiple patches over time (instead of all at once), a much bigger effective neural network can be achieved with relatively small number of physical neurons.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus for implementing an artificial neural network, the apparatus comprising:
    one or more input waveguides to receive a first array of optical signals;
    an optical interference unit, in optical communication with the one or more input waveguides, to perform a linear transformation of the first array of optical signals into a second array of optical signals;
    a nonlinearity unit, in communication with the optical interference unit, to perform a nonlinear transformation on the second array of optical signals so as to generate a third array of signals;

a detector array to detect at least a first portion of the third array of signals and generate an array of electrical signals in response to detecting the first portion of the third array of signals; and a switch to controllably couple a second portion of the third array of signals back into the optical interference unit via at least one of the one or more input waveguides.

2. The apparatus of claim 1, further comprising a light source in optical communication with the one or more input waveguides.

3. The apparatus of claim 2, further comprising feedback circuitry to transmit the array of electrical signals to the light source, and wherein the light source is configured to emit a fourth array of optical signals based on the array of electrical signals.

4. The apparatus of claim 3, wherein at least one of the one or more input waveguides are positioned to receive the fourth array of optical signals and direct them to the optical interference unit.

5. The apparatus of claim 1, further comprising one or more output waveguides, in optical communication with the optical interference unit, to guide the second array of optical signals, wherein at least one of the one or more input waveguides is in optical communication with each of the output waveguides via the optical interference unit.

6. The apparatus of claim 1, wherein the optical interference unit comprises:
a plurality of interconnected Mach-Zehnder interferometers (MZIs), each MZI in the plurality of interconnected MZIs comprising:
a first phase shifter configured to change a splitting ratio of the MZI; and
a second phase shifter configured to shift a phase of one output of the MZI.

7. The apparatus of claim 6, wherein the plurality of interconnected MZIs is configured to perform the linear transformation of the first array of optical signals via singular value decomposition (SVD).

8. The apparatus of claim 6, wherein the plurality of interconnected MZIs comprises:
a first set of MZIs to perform a unitary transformation of the first array of optical signals to generate a first array of transformed optical signals; and
a second set of MZIs in optical communication with the first set of MZIs, each MZI in the second array of MZIs receiving a respective transformed optical signal from the first array of transformed optical signals and transmitting a first output to the nonlinearity unit, wherein a second output of each MZI in the second array of MZIs is optically blocked so as to change a total intensity of the first array of transformed optical signals and perform a non-unitary diagonal matrix multiplication of the first array of transformed optical signals.

9. The apparatus of claim 1, wherein the optical interference unit comprises:
a plurality of interconnected MZIs to perform a unitary transformation of the first array of optical signals; and
an array of optical attenuators or amplifiers, in optical communication with the plurality of MZIs, to change an intensity of the first array of optical signals after the plurality of MZIs.

10. The apparatus of claim 1, wherein the optical interference unit comprises a network of photonic crystals.

11. The apparatus of claim 10, further comprising a phase change material coated on at least one photonic crystal in the network of photonic crystals.

12. The apparatus of claim 1, wherein the optical interference unit comprises a two-dimensional (2D) array of ring resonators.

13. The apparatus of claim 1, wherein the first array of optical signals includes a first number of optical signals, the second array of the optical signals includes a second number of optical signals, and the first number is different than the second number.

14. The apparatus of claim 1, wherein the third array of signals is a third array of optical signals, and wherein the nonlinearity unit is an optical nonlinearity unit, in optical communication with the optical interference unit, to perform the nonlinear transformation on the second array of optical signals so as to generate the third array of optical signals.

15. The apparatus of claim 14, wherein the detector array is in optical communication with the optical nonlinearity unit.

16. The apparatus of claim 15, further comprising:
control circuitry, operably coupled to the optical interference unit, the optical nonlinearity unit, and the detector array, to adjust a setting of at least one of the optical interference unit or the optical nonlinearity unit based at least in part on the first portion of the third array of optical signals detected by the detector array.

17. The apparatus of claim 1, wherein the nonlinearity unit implements the nonlinear transformation in the electronic domain by measuring optical intensities of the second array of optical signals with a photodetector array and electronically applying the nonlinear transformation to the measured optical intensities to generate the third array of signals.

18. The apparatus of claim 1, wherein the second array of optical signals can be represented as $Z_i=|E_i|^2$, where $E_i$ is the electric field of $i^{th}$ optical signal in the second array of optical signals and the nonlinear transformation applies a nonlinear function f to the second array of optical signals to yield the third array of signals $f(Z_i)$.

19. The apparatus of claim 1, wherein the optical interference unit and the nonlinearity unit form one hidden layer in a sequence of hidden layers of the artificial neural network.

20. A method for artificial neural network computation, the method comprising:
receiving a first array of optical signals with one or more input waveguides;
interfering the first array of optical signals, using an optical interference unit in optical communication with the one or more input waveguides, to linearly transform the first array of optical signals into a second array of optical signals;
nonlinearly transforming the second array of optical signals using a nonlinearity unit, in communication with the optical interference unit, so as to generate a third array of signals; and
detecting at least a first portion of the third array of signals to generate an array of electrical signals; and
coupling a second portion of the third array of signals back into the optical interference unit via at least one of the one or more input waveguides.

21. The method of claim 20, further comprising providing a fourth array of optical signals to at least one of the one or more input waveguides based on the array of electrical signals to direct the fourth array of optical signals to the optical interference unit.

22. The method of claim 20, further comprising guiding the second array of signals using one or more output waveguides, wherein at least one of the one or more input waveguides is in optical communication with each of the output waveguides via the optical interference unit.

23. The method of claim 20, wherein interfering the first array of optical signals comprises:
propagating the first array of optical signals through a plurality of interconnected Mach-Zehnder interferometers (MZIs);
changing a splitting ratio of at least one MZI in the plurality of interconnected MZIs; and
shifting a phase of one output of the at least one MZI.

24. The method of claim 23, wherein propagating the first array of optical signals through the plurality of interconnected MZIs comprises performing a linear transformation on the first array of optical signals via singular value decomposition (SVD).

25. The method of claim 23, wherein propagating the first array of optical signals through the plurality of interconnected MZIs comprises:
performing a unitary transformation of the first array of optical signals with a first set of MZIs to generate a first array of transformed optical signals; and
changing a total intensity of the first array of transformed optical signals with a second set of MZIs in optical communication with the first set of MZI, each MZI in the second array of MZIs receiving a respective transformed optical signal from the first array of transformed optical signals and transmitting a first output to the nonlinearity unit, wherein a second output of each MZI in the second array of MZIs is optically blocked.

26. The method of claim 20, wherein interfering the first array of optical signals comprises:
performing a unitary transformation of the first array of optical signals with a plurality of interconnected MZIs; and
attenuating or amplifying the first array of optical signals with an array of optical attenuators in optical communication with the plurality of MZIs.

27. The method of claim 20, wherein interfering the first array of optical signals comprises:
propagating the first array of optical signals through a network of photonic crystals.

28. The method of claim 27, further comprising:
changing a phase of a phase change material coated on at least one photonic crystal in the network of photonic crystals so as to change interference of the first array of optical signals.

29. The method of claim 20, wherein interfering the first array of optical signals comprises:
propagating first array of optical signals through a two-dimensional (2D) array of ring resonators.

30. The method of claim 20, wherein the third array of signals is a third array of optical signals, and the nonlinearity unit is an optical nonlinearity unit in optical communication with the optical interference unit.

31. The method of claim 20, further comprising:
adjusting a setting of at least one of the optical interference unit or the nonlinearity unit based at least in part on the third array of optical signals.

32. The method of claim 20, wherein the nonlinearity unit implements the nonlinear transformation in the electronic domain by measuring optical intensities of the second array of optical signals with a photodetector array and electronically applying the nonlinear transformation to the measured optical intensities to generate the third array of signals.

33. The method of claim 20, wherein the second array of optical signals can be represented as $Z_i=|E_i|^2$, where $E_i$ is the electric field of $i^{th}$ optical signal in the second array of optical signals and the nonlinear transformation applies a nonlinear function f to the second array of optical signals to yield the third array of signals $f(Z_i)$.

* * * * *